US012327464B1

(12) United States Patent
Maisano

(10) Patent No.: US 12,327,464 B1
(45) Date of Patent: Jun. 10, 2025

(54) PERSONAL TRACKING AND COMMUNICATION SYSTEM AND METHOD

(71) Applicant: Patricia Maisano, Kennett Square, PA (US)

(72) Inventor: Patricia Maisano, Kennett Square, PA (US)

( * ) Notice: Subject to any disclaimer, the term of this patent is extended or adjusted under 35 U.S.C. 154(b) by 0 days.

(21) Appl. No.: 17/842,640

(22) Filed: Jun. 16, 2022

Related U.S. Application Data

(63) Continuation of application No. 16/938,990, filed on Jul. 26, 2020, now Pat. No. 11,393,319.

(60) Provisional application No. 62/879,564, filed on Jul. 29, 2019.

(51) Int. Cl.
*G08B 21/04* (2006.01)
*G08B 25/00* (2006.01)
*G08B 27/00* (2006.01)

(52) U.S. Cl.
CPC ....... *G08B 21/0453* (2013.01); *G08B 21/043* (2013.01); *G08B 25/005* (2013.01); *G08B 27/005* (2013.01)

(58) Field of Classification Search
CPC .............. G08B 21/0453; G08B 21/043; G08B 25/005; G08B 27/005; G08B 25/10; G08B 25/009; G08B 1/08; H04Q 9/00; G08C 17/02
See application file for complete search history.

(56) References Cited

U.S. PATENT DOCUMENTS 3,729,923 A * 5/1973 Brigliano ............... G04B 19/30 362/802
4,694,284 A 9/1987 Leveille et al.
5,075,670 A 12/1991 Bower et al.
5,612,675 A 3/1997 Jennings et al.
5,627,520 A 5/1997 Grubbs et al.
6,031,460 A 2/2000 Banks
6,104,295 A * 8/2000 Gaisser ................ G08B 3/1083 340/572.9
6,346,886 B1 2/2002 Huerga
6,388,612 B1 * 5/2002 Neher .................. G08B 25/016 63/3.1
6,472,989 B2 10/2002 Roy, Jr.
6,600,812 B1 7/2003 Gentillin et al.
(Continued)

FOREIGN PATENT DOCUMENTS

CN 202887238 U 4/2013
CN 203873142 U 10/2014
(Continued)

*Primary Examiner* — Curtis J King
(74) *Attorney, Agent, or Firm* — Hanrahan Law Firm, P.A.; Benjamin M. Hanrahan

(57) ABSTRACT

An individual tracking and communication system and method is presented herein. The system and method includes a wearable device adapted to be worn by a user and a caregiver device operated by a caregiver. The wearable device and caregiver device are paired to one another by being assigned to the same group via a management dashboard, and thereby allowing for communications to occur there between. The wearable device is configured to initiate and receive voice communications with the caregiver device, and to automatically initiate a communication with an emergency service if an attempt to initiate a voice communication with the caregiver device fails.

15 Claims, 21 Drawing Sheets

(56) References Cited

U.S. PATENT DOCUMENTS 6,693,543 B1 2/2004 Stephenson et al.
6,933,844 B2 * 8/2005 Augspurger .......... G09F 3/0376 340/568.8
7,038,590 B2 5/2006 Hoffman et al.
7,109,847 B1 * 9/2006 Hill ....................... G09F 3/0335 340/568.8
7,825,794 B2 11/2010 Janetis et al.
8,484,352 B2 7/2013 Piett et al.
8,485,448 B2 7/2013 Maizlin et al.
8,514,070 B2 8/2013 Roper et al.
8,516,122 B2 8/2013 Piett et al.
9,064,391 B2 6/2015 Vardi et al.
9,078,092 B2 7/2015 Piett et al.
9,443,415 B2 9/2016 Nepo
9,460,612 B2 10/2016 Vardi
9,594,354 B1 3/2017 Kahn et al.
10,043,369 B2 8/2018 Hopkins et al.
10,109,173 B2 10/2018 Keyton
10,395,500 B1 * 8/2019 Miller ...................... A44C 5/18
10,478,127 B2 11/2019 Sampson
2002/0145946 A1 * 10/2002 Meylan .................. G04C 3/001 368/281
2004/0008585 A1 * 1/2004 Augspurger .......... G09F 3/0376 368/10
2004/0137939 A1 7/2004 Deubler
2004/0189470 A1 * 9/2004 Girvin ................ G08B 13/2454 340/568.2
2004/0214568 A1 * 10/2004 Anderson ......... H04M 3/42382 455/404.1
2005/0018546 A1 * 1/2005 Galli ...................... G04B 19/30 368/227
2005/0075116 A1 * 4/2005 Laird ....................... A61B 5/24 455/414.1
2005/0151642 A1 7/2005 Tupler et al.
2006/0261958 A1 * 11/2006 Klein ................... A01K 27/009 340/573.1
2007/0011870 A1 * 1/2007 Lerch ............... G06K 19/07762 29/846
2007/0018832 A1 * 1/2007 Beigel .............. G06K 19/07762 340/572.7
2007/0086578 A1 4/2007 Hansen et al.
2007/0132578 A1 6/2007 Powell
2009/0303031 A1 12/2009 Strohallen et al.
2009/0315716 A1 12/2009 Lerch et al.
2010/0238033 A1 9/2010 Blumel et al.
2010/0267361 A1 * 10/2010 Sullivan .................. G01S 19/17 455/404.2
2012/0041278 A1 2/2012 Sadhu
2012/0271646 A1 * 10/2012 Feldman ................ G08B 25/08 705/2
2013/0182382 A1 7/2013 Vardi et al.
2013/0321145 A1 * 12/2013 Ranieri .................. G16H 40/20 340/539.12
2014/0028456 A1 1/2014 Sadhu
2014/0090213 A1 * 4/2014 Shikowitz ............ A44C 5/2085 24/587.12
2015/0057512 A1 2/2015 Kapoor
2015/0077257 A1 3/2015 Pokrajac et al.
2015/0228175 A1 8/2015 Paula-Molina et al.
2015/0269824 A1 9/2015 Zhang
2015/0269827 A1 9/2015 Hopkins et al.
2016/0037841 A1 * 2/2016 Dey ..................... A44C 27/001 2/170
2016/0071392 A1 3/2016 Hankey et al.
2016/0088880 A1 * 3/2016 Tulloch .................. H01R 31/06 439/345
2016/0163011 A1 6/2016 Zimmerman et al.
2016/0189513 A1 6/2016 Sloo
2016/0247156 A1 8/2016 Hwang et al.
2016/0255944 A1 * 9/2016 Baranski .............. A44C 5/2071
2016/0266606 A1 9/2016 Ricci
2016/0302719 A1 10/2016 Ezeuka
2016/0317341 A1 * 11/2016 Galvan ..................... A61F 5/02
2016/0327979 A1 11/2016 Lettow
2017/0039833 A1 2/2017 Baczuk et al.
2017/0041702 A1 * 2/2017 Bae ...................... A44C 5/0092
2017/0120932 A1 5/2017 Szczerba et al.
2017/0140629 A1 5/2017 Briggs et al.
2017/0179987 A1 * 6/2017 Meyers ........... H04M 1/724095
2017/0230794 A1 8/2017 Ramamurthy et al.
2017/0239418 A1 8/2017 Levine et al.
2017/0340221 A1 11/2017 Cronin et al.
2017/0372592 A1 * 12/2017 Neravati ............ G08B 21/0446
2018/0113987 A1 4/2018 Zhu
2018/0176362 A1 6/2018 Cohen
2018/0325426 A1 11/2018 Shaw et al.
2018/0365958 A1 12/2018 Beszteri et al.
2019/0057189 A1 2/2019 Frederickson et al.
2019/0197864 A1 6/2019 Hui et al.
2019/0364983 A1 * 12/2019 Nakajima ................ A41H 3/06
2020/0000395 A1 1/2020 Ganesan
2020/0037904 A1 * 2/2020 Tegen .................... A61B 5/746
2021/0020020 A1 * 1/2021 Rothschild ......... G08B 21/0453
2021/0289319 A1 * 9/2021 Antony ..................... G06F 8/65
2021/0365865 A1 11/2021 Jones et al.
2021/0368949 A1 * 12/2021 Prasitkittanai ....... A44C 5/2057
2021/0391084 A1 * 12/2021 Adams ................... G16H 40/63
2022/0051542 A1 * 2/2022 Alvarez ............. G08B 21/0283
2022/0104917 A1 * 4/2022 Pollack ................... G09F 3/185
2022/0185033 A1 * 6/2022 West ................... B60C 23/0493
2022/0398914 A1 * 12/2022 Cardona ................ G08B 25/12
2023/0218049 A1 * 7/2023 Sun ........................ A44B 11/24 24/307

FOREIGN PATENT DOCUMENTS

CN 205003452 U 1/2016
GB 2452335 A 3/2009
WO 2010089745 A2 8/2010
WO 2017059698 A1 4/2017
WO 2018201188 A1 11/2018

* cited by examiner

85

PERSONAL TRACKING AND COMMUNICATION SYSTEM AND METHOD

CLAIM OF PRIORITY/CROSS-REFERENCE TO RELATED APPLICATION

The present application is a Continuation patent application of previously-filed, currently-pending U.S. patent application Ser. No. 16/938,990 filed on Jul. 26, 2020, which is based on and claims priority under 35 U.S.C. § 119 (e) to U.S. Provisional Patent Application No. 62/879,564, filed on Jul. 29, 2019.

The contents of both of the above-referenced prior patent applications, namely, U.S. Patent application Ser. No. 16/938,990 filed on Jul. 26, 2020 and U.S. Provisional Patent Application No. 62/879,564 filed on Jul. 29, 2019, are incorporated herein in their entirety by reference.

FIELD OF THE INVENTION

The present invention is directed to a personal or individual tracking and communication system and method.

BACKGROUND OF THE INVENTION

It is common for senior citizens, as well as individuals diagnosed with or otherwise having memory loss or impairment (including, but not limited to effects of Alzheimer's disease or dementia), individuals who may have suffered from a traumatic head or brain injury, or individuals with Cerebral Palsy, Autism, or other physical, mental or emotional impairments or disabilities often walk away from homes, hospitals, or other facilities and become lost or have difficultly returning home.

Furthermore, statistics are showing that memory loss resulting from Alzheimer's disease and/or dementia, which was once seen only in the senior population, is now being diagnosed in people as young as 30 or 35 years old. Accordingly, with life expectancy increasing, and the age of individuals being diagnosed with Alzheimer's disease, dementia, etc. decreasing, people need some level of independence and security at all ages.

There is thus a need in the art for a system that allows individuals who may have a tendency to walk away from homes, hospitals, or other facilities to retain some independence while offering peace of mind for them and their loved ones. The proposed system may relieve some financial and time burden on their families and other caregivers. For instance, many caregivers are family members who are still trying to work full time jobs and live their own lives. In some situations, the proposed system will be able to lessen the required professional care of the patient or individual which would result in less money spent on care. For larger facilities, the proposed system can be used as an additional benefit to their residents or patients which can often result in quicker response times in the event of an emergency.

More in particular, there is a need for a system that includes a wearable device, that can monitor or track the location of a user or wearer thereof, including, children, teenagers or adults. It would also be advantageous if the proposed wearable device is configured to initiate communications with a corresponding caregiver device and an emergency service, for example, in the event of an emergency.

For instance, the proposed system may initiate communications with traditional 9-1-1 emergency services. In other embodiments, the wearable device may be configured to communicate with other emergency services, including but in no way limited to SMART911™ or similar services. More specifically, SMART911™ is an emergency service that has the capability to receive detailed information from the caller such as the caller's location or address, medical information, home information, emergency contacts, etc. Other information can be communicated to the emergency service, such as a photograph or image of the caller, any known conditions that may be impacting the caller, emergency contact information, etc.

SUMMARY OF THE INVENTION

Accordingly, the present invention is directed to an individual tracking and communication system and method. The system may include one or more wearable devices adapted to be attached to or otherwise worn by a user, for example, but not limited to around the user's wrist. The wearable device may, in some embodiments, be attached using a hard-to-remove clasp or locking mechanism such that it is difficult or nearly impossible for the user or an unauthorized individual to remove the device without approval or permission.

In some embodiments, the system also includes one or more caregiver devices or caregiver applications. Particularly, in some cases, the caregiver application can be downloaded or installed on a personal smartphone or other like device, thereby causing the smartphone or other like device to operate as the caregiver device, as used herein. In other embodiments or implementations, such as when the system is used by an institution or facility that provides medical and/or nursing care to patients, such as a medical hospital, psychiatric hospital, nursing home or elderly care facility, designated caregiver devices can be used with the caregiver application already installed or accessible.

In additional embodiments, a management system or dashboard may be included in order to manage and track a plurality of wearable devices and a plurality of caregiver devices that May be associated with a particular facility.

More in particular, the wearable device may be configured to engage in two-way voice calling with a paired caregiver device or application, for example, via the selection of a button or a sequence of buttons on the wearable device. In some cases, the wearable device will first try to connect with one or more caregiver(s) or caregiver device(s). However, if the wearable device is unable to connect with the caregiver(s) or caregiver device(s), an emergency communication to an emergency service, such as 9-1-1 or SMART911™ may be automatically initiated from the wearable device.

Further features may include the implementation of a geofence defining a geographical area by distance from a point or address, or through the definition of barriers or markers. The geofence can be defined by the caregiver using the caregiver application or device, or by an administrator using the management system or dashboard. Using location services of the wearable device, when or if the device exits and/or enters the geofence, an alert or notification is generated and communicated to the caregiver device or application.

In yet another embodiment, the wearable device(s) and caretaker device(s) can be paired to one another, for example, by entering a unique device ID within the caretaker application, or by assigning the wearable device and caregiver device to a common group. Additional pairing parameters can include a shift which defines one or more days and times which the caregiver is on duty. In such a case, the caregiver's device will only be paired to wearable devices during the shift and only those wearable device that are assigned to the same group with which the caregiver device is assigned.

In the regard, communication between the caregiver device or application and the wearable device can only occur when the devices are paired. In other words, when the devices are not paired (e.g., the devices are not assigned to any common groups, or it is outside of the day/time window of the caregiver's assigned shift) the caregiver device will not display alerts, or patient information associated with the wearable device, nor can the caregiver or the user communicate with one another via the system of at least one embodiment of the present invention.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
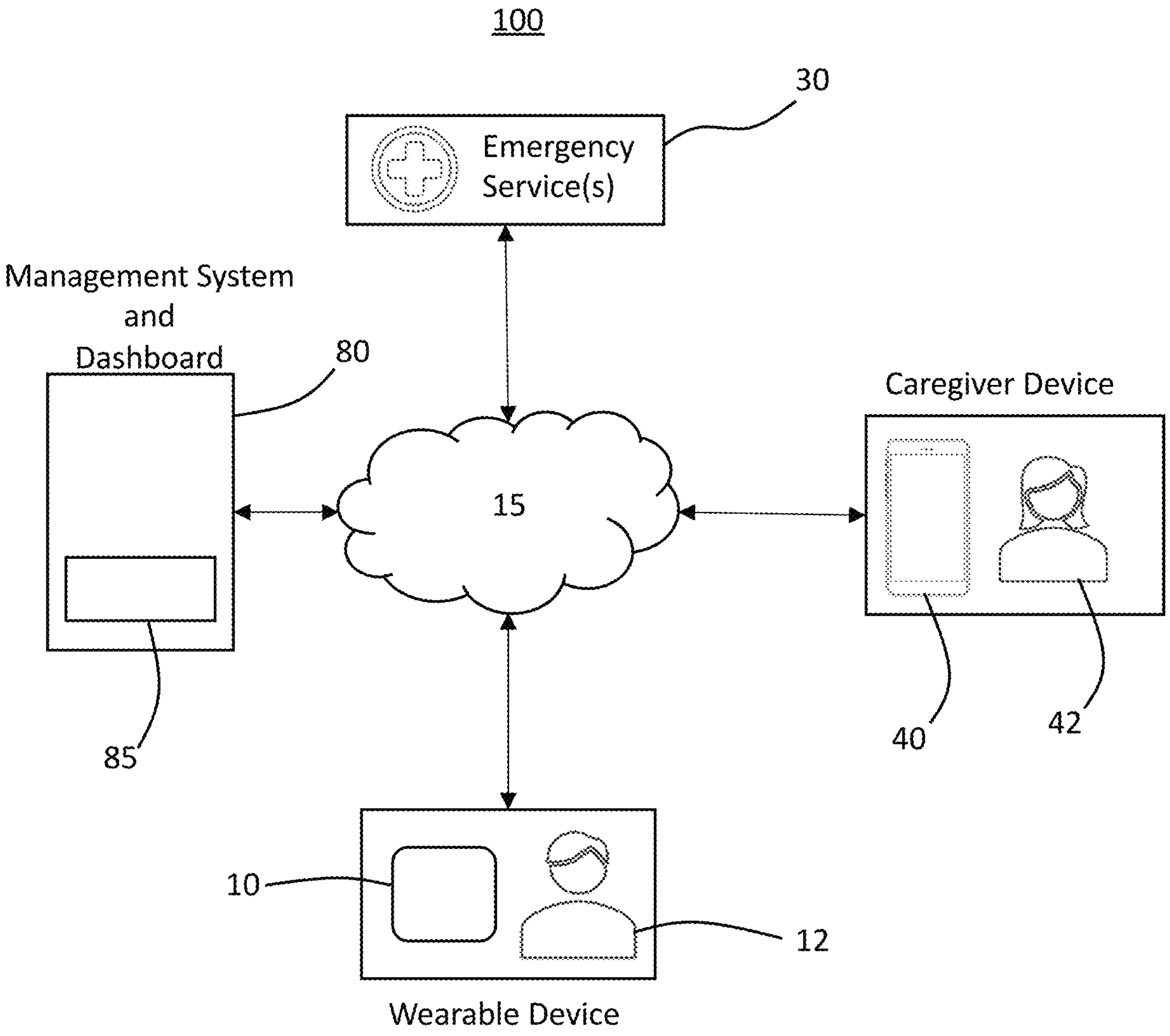
FIG. 1 is a block diagram of the system as disclosed in accordance with at least one embodiment of the present invention.

As shown in the accompanying drawings, and with particular reference to FIG. 1, for example, the present invention is directed to a personal or individual tracking and communication system, generally referenced as 100. As described herein, the system 100 includes a wearable device 10, a caregiver device 40 and/or caregiver application 45, and in some embodiments, an administrative device or dashboard 80. More in particular, in accordance with certain embodiments of the present invention, a device user 12 will wear the device 10, for example, but not limited to, around his or her wrist. Various location tracking features and communication features allow a caregiver 42, operating the caregiver device 40 or otherwise accessing the caregiver application 45, to track, monitor and communicate with the user 12. In some embodiments, as described herein, the device 10 may operate to communicate with emergency services, represented as 30, such as, but not limited to traditional 9-1-1 operator and/or dispatch services and/or SMART911™ services.

Furthermore, it should be noted that the device user 12 or wearer, as used herein, can be virtually any individual, including, for example, a baby, child, teenager, adult or senior citizen. It should be noted that certain embodiments of the present invention may be beneficial to users 12 who are children, senior citizens, individuals who have been diagnosed with or otherwise have memory loss or impairment (including, but not limited to effects of Alzheimer's disease or dementia), individuals who may have suffered from a traumatic head or brain injury, or individuals with Cerebral Palsy, Autism, or other physical, mental or emotional impairments or disabilities. In this manner, the system 100 of the present invention can be used or operated by private individuals or families, for example, who may want to track, monitor or provide care to a family member or friend, while in other embodiments, the system 100 may be operated by an institution or facility that provides medical and/or nursing care to patients, such as a medical hospital, psychiatric hospital, nursing home or elderly care facility.

In any event, and still referring to FIG. 1, the system of the present invention includes one or more networks or communication channels generally referenced as 15. For instance, the various devices such as the wearable device 10, caregiver device 40, caregiver application 45, and/or dashboard or dashboard device 80, communicate over one or more networks 15. Multiple modes of communication may be implemented such that the devices can communicate over data networks, telecommunication networks or virtually any communication network within the full spirit and scope of the present invention. Accordingly, the network or communication channel 15 may be defined as one or more telecommunication networks, including for example, wireless mobile telecommunications technology (e.g., third generation or 3G networks, fourth generation or 4G networks, fifth generation or 5G networks, long-term evolution or LTE networks, etc.) Other networks 15 can include computer networks, the Internet, global telex networks, data or TCP/IP networks, such as Wide Area Networks (WAN), Metropolitan Area Networks (MAN), Local Area Networks (LAN), Internet Area Networks (IAN), etc.

Furthermore, the wearable device 10 of at least one embodiment of the present invention is adapted to be worn or attached to the user 12, for example, in the form of a wrist band, watch, etc., although other forms or locations on the user's body for wearing the device 10 are contemplated. In some cases, as described in more detail below, the device 10 may be difficult or nearly impossible for the unauthorized removal of the device 12 from the user 12 without breaking or destroying the device 10. In particular, in some cases, the device 10 may include a locking mechanism which can be unlocked by a caregiver, administrator or other authorized individual. Other embodiments may include certain detection features, such as sensors or circuits running through a band to detect when the device 10 is removed or broken, for example, in an unauthorized manner.

In any event, the device 10 of at least one embodiment includes a body 20 and a band 22. The body 20 and the band 22 are connected to one another to form a wearable device 10. Specifically, the band 22 may form a loop that can encircle a body portion, such as a wrist, arm, ankle or leg, although in most cases, the device 10 of the present invention will be intended to be worn around the user's wrist.

Figure 2:
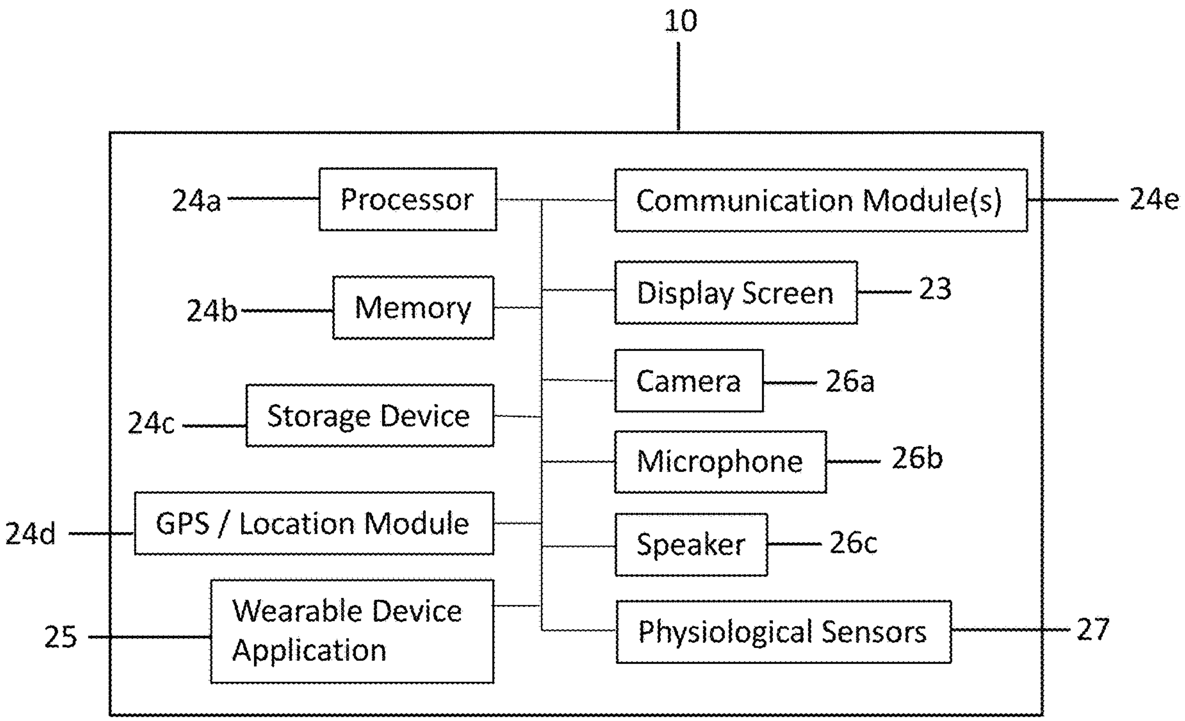
FIG. 2 is a block diagram of the wearable device as disclosed in accordance with at least one embodiment of the present invention.

With reference to FIG. 2, the device 10, such as, for example, the body 20 thereof, May include, among other components and devices structured to facilitate implementation of the present invention in the intended manner, a processor 24*a*, memory 24*b*, a data storage device 24*c*, a location detection device or module (e.g., GPS) 24*d*, and one or more communication modules 24*e*.

Specifically, as used herein, the processor 24*a* of at least one embodiment may include any device cooperatively structured to execute or implement computer instructions, software, etc., including, for example, the various features and components as described in accordance with at least one embodiment of the present invention, such as one or more applications or operating systems executing on the device 10. The memory device 24*b*, as used herein, may include but is not limited to random access memory (RAM) or other like devices configured to implement the present invention in the intended manner, for example, by storing and assisting with the execution of one or more applications, modules, or components capable of implementing the apparatus 10 and features thereof as described herein. In some cases, the processor 24*a* and memory 24*b* can be combined to a single microcontroller as is known in the art. Further, the data storage device 24*c*, as used herein, may include a hard disk drive, solid state drive, virtual drive, could-based storage drive, or other types of volatile or non-volatile memory. It should be noted that non-transitory computer readable media includes all computer-readable media except for a transitory, propagating signal.

The one or more communication modules 24*e* as used herein includes one or more modules implemented in hardware and/or software adapted to communicate a signal, message, phone call or data communication via the network(s) 15, for example, to/from the caregiver application or device, the emergency service(s), and/or in some cases, the dashboard. In some embodiments, the device 10 of the present invention includes an always-on LTE, such as 4G LTE, 5G LTE, or other wireless broadband communication connection. This allows the device 12 to always be capable of communication as disclosed in connection with the various embodiments described herein, such as, two-way voice calling with the caregiver application or device or emergency services, SMS communications, communicating notifications, data (e.g., heart rate, or other vital information from the user), etc.

In addition, the wearable device 10 of at least one embodiment may include other modules, features or structures which facilitate implementation of various features described herein, such as, but not limited to, a camera 26*a* (e.g., capable of recording or. obtaining still and moving images or video), one or more speakers 26*b*, a microphone 26*b*, etc. Some embodiments may include a gyroscope and/or accelerometer, for example, to track movement. of the device, including for example, to determine how many steps the user takes. Further embodiments may also include one or more physiological sensors or monitors, such as, but not limited to heart rate, blood pressure, breathing pattern, etc.

Figure 3:
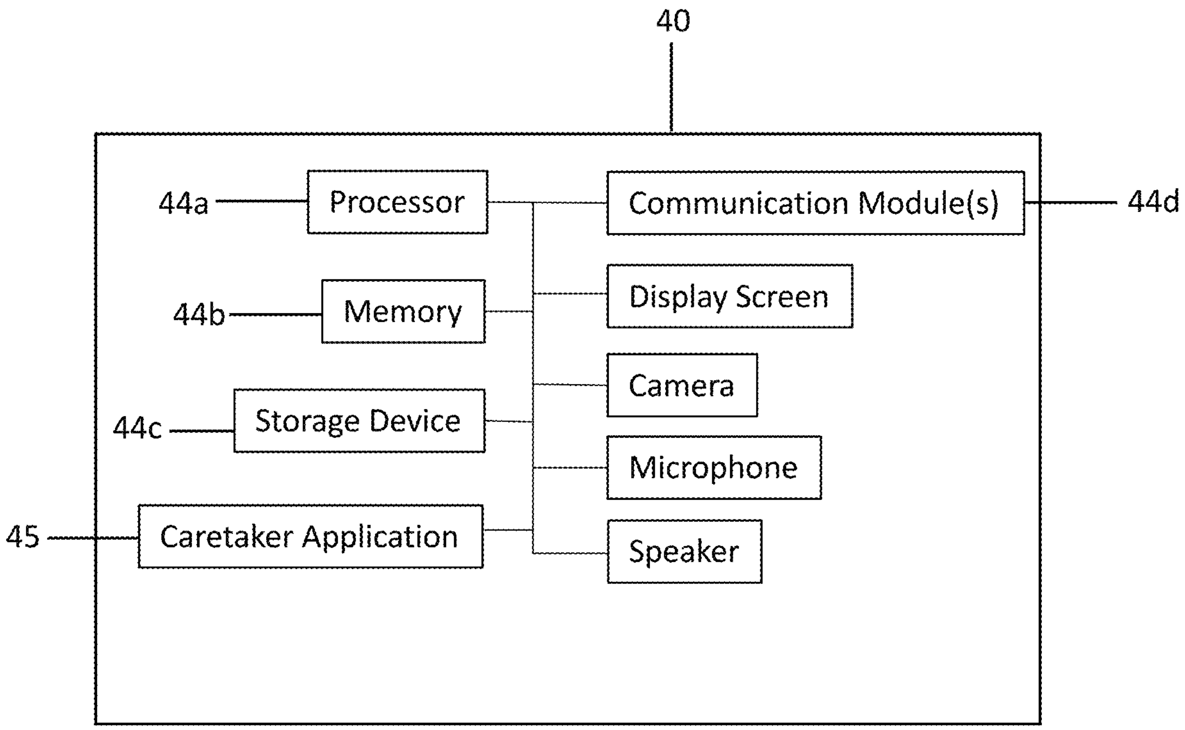
FIG. 3 is a block diagram of the caregiver device as disclosed in accordance with at least one embodiment of the present invention.

With reference to FIG. 3, the caregiver device 40 may include, among other components and devices structured to facilitate implementation of the present invention in the intended manner, a processor 44*a*, memory 44*b*, a data storage device 44*c*, and one or more communication modules 44*d*.

Specifically, as used herein, the processor 44*a* of at least one embodiment may include any device cooperatively structured to execute or implement computer instructions, software, etc., including, for example, the various features and components as described in accordance with at least one embodiment of the present invention, such as the caregiver application 45. The memory device 44_b_, as used herein, may include but is not limited to random access memory (RAM) or other like devices configured to implement the present invention in the intended manner, for example, by storing and assisting with the execution of one or more applications, modules, or components capable of implementing the apparatus 10 and features thereof as described herein. In some cases, the processor 44_a_ and memory 44_b_ can be combined to a single microcontroller as is known in the art. Further, the data storage device 44_c_, as used herein, may include a hard disk drive, solid state drive, virtual drive, could-based storage drive, or other types of volatile or non-volatile memory. It should be noted that non-transitory computer readable media includes all computer-readable media except for a transitory, propagating signal.

The one or more communication modules 44_e_ as used herein includes one or more modules implemented in hardware and/or software adapted to communicate a signal, message, phone call or data communication via the network(s) 15, for example, to/from the wearable device 10, and/or in some cases, the dashboard 80. In some embodiments, the caregiver device 40 of the present invention includes an always-on LTE connection, such as 4G LTE, 5G LTE, or other wireless broadband communication connection. This allows the caregiver device 40 to always be capable of communication as disclosed in connection with the various embodiments described herein, such as, two-way voice calling with the wearable device 10 or emergency services, SMS communications, communicating or receiving notifications, data (e.g., heart rate, or other vital information from the user), etc.

Accordingly, the caregiver device 40 of certain embodiments or implementations of the present invention may include any mobile device or mobile terminal such as, but not limited to a mobile phone, smartphone, tablet computer, etc. (e.g., APPLE® iPHONE®, ANDROID® based phone, etc.), and/or any laptop or mobile computers, desktop computers, etc.

Figure 4A:
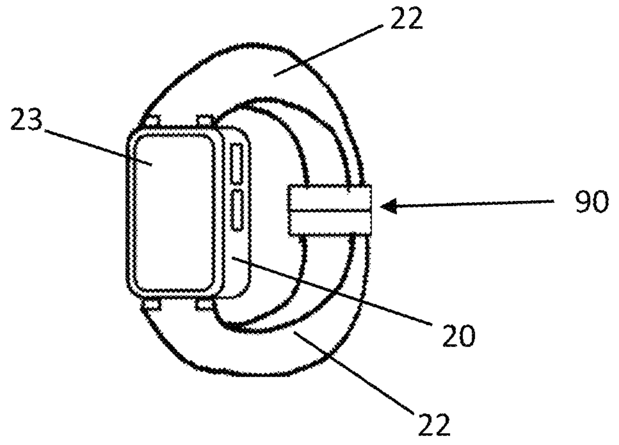
FIG. 4A is a perspective view of an exemplary wearable device as disclosed in accordance with at least one embodiment of the present invention.
Figure 4B:
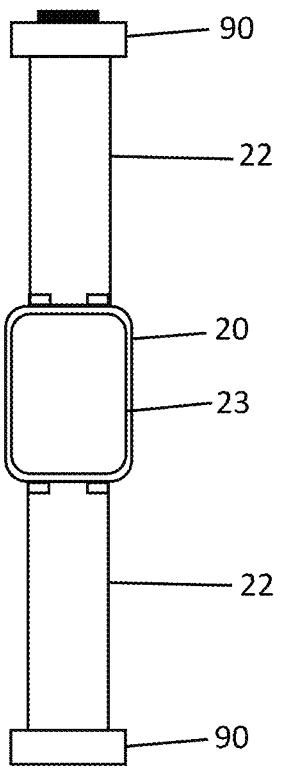
FIG. 4B is top view of the wearable device illustrated in FIG. 4A.
Figure 4C:
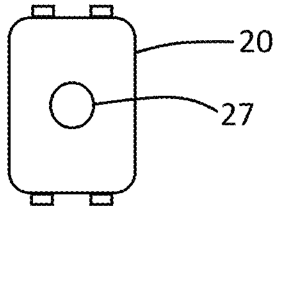
FIG. 4C is a bottom view of the body of the device illustrated in FIGS. 4A and 4B.

With reference now to FIGS. 4A, 4B and 4C, an exemplary wearable device 10 as disclosed in accordance with at least one embodiment is illustrated. As shown, the device 10 includes a main body 20 and one or more straps or attachment mechanisms 22. The device 10, and in many cases, the body 20 thereof also includes a display screen, referenced as 23, upon which the user interface of a device application is displayed. In many embodiments, the display screen is a touchscreen such that user interaction can be performed by using a finger or a stylus, however, other embodiments may not employ a touchscreen and may still fall within the scope of the present invention.

In any event, FIGS. 5A through 5K illustrate exemplary screenshots of the wearable device application 25 and wherein various features of the device 10 are shown and described. More in particular, with reference to FIG. 5A, the main screen of the device application 25 is shown which includes a number of buttons or selectable items referenced as 120_a_, 120_b_, 120_c_, and 120_d_. In the embodiment shown, there are four buttons on the main screen, although other embodiments or implementations may include more or less. When the user selects button 120_a_, with the "Caretaker" label or other similar notation, the device 10 will activate or initiate a communication sequence in which the device 10 may be able to communicatively interconnect with the caregiver device 40 or application 45, for example, via two-way voice calling. As mentioned below, the sequence may begin to dial or call immediately when the user selects button 120_a_, while in other cases, the sequence may require the user to select a caretaker, select a "call" button, etc.

Specifically, in some cases, the device 10 may be pre-programmed or paired with a single caretaker. In such a case, selecting item 120_a_ may immediately begin to call the caretaker device or application which is paired or otherwise linked to the device 10. In other embodiments, the device 10 may be paired with or linked to a plurality of caretakers from which the user can select. FIG. 5B shows an exemplary screenshot illustrating a list of caretakers 122 that may appear and from which the user can select to communicate with. Selecting one of the caretaker's names will, in at least one embodiment, initiate a communication from the wearable device 10 to the selected caretaker device 40 or application 45.

It should be noted that the device 10 may communicate with the caretaker device 40 or caretaker application 45 via the caretaker device's phone number, device ID, email address, a unique caretaker ID, etc. The communication may take place over an LTE network, or other communication, telecommunication or data network.

Figure 5A:
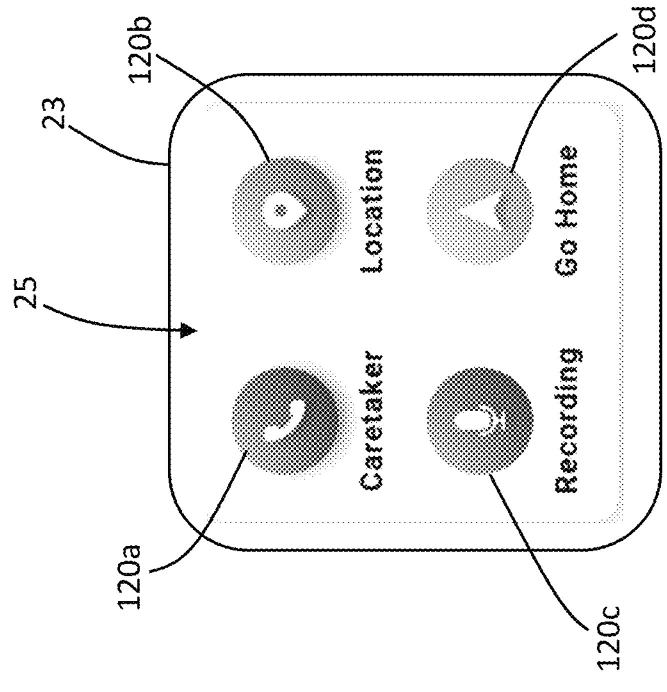
FIG. 5A is an exemplary illustration of the display screen of the wearable device showing the wearable device application displayed thereon.
Figure 5B:
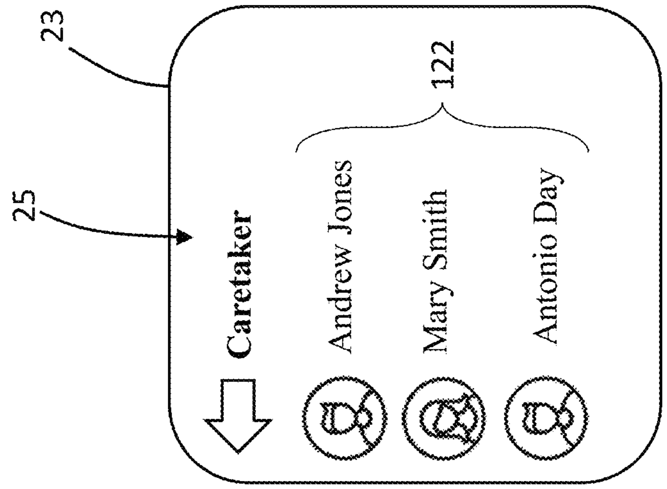
FIG. 5B is another exemplary illustration of the display screen of the wearable device showing the wearable device application displayed thereon.
Figure 5C:
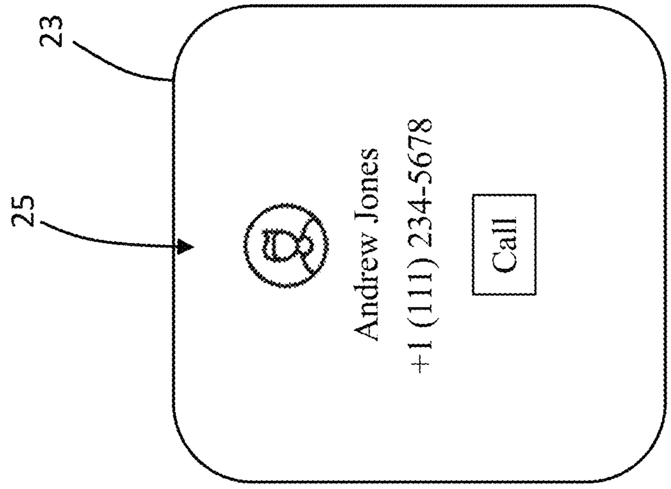
FIG. 5C is another exemplary illustration of the display screen of the wearable device showing the wearable device application displayed thereon.
Figure 5D:
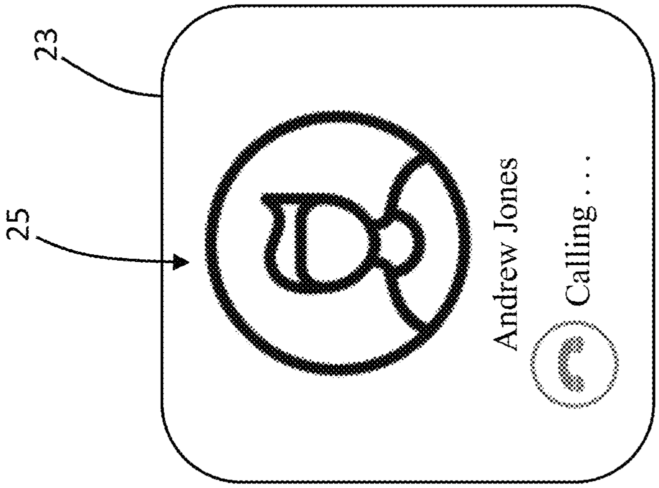
FIG. 5D is another exemplary illustration of the display screen of the wearable device showing the wearable device application displayed thereon.
Figure 5E:
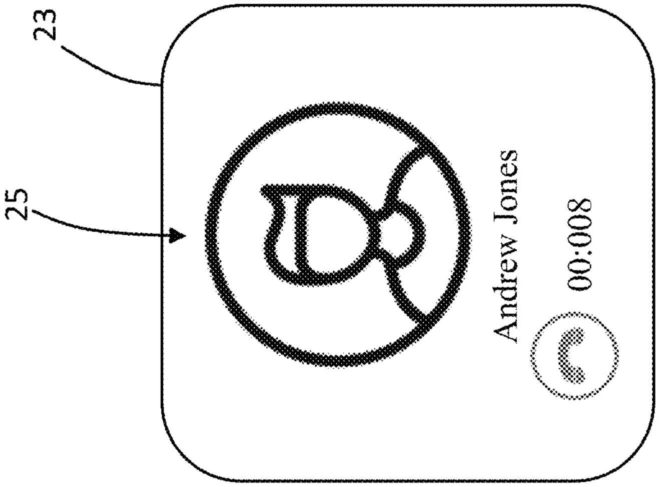
FIG. 5E is another exemplary illustration of the display screen of the wearable device showing the wearable device application displayed thereon.
Figure 5F:
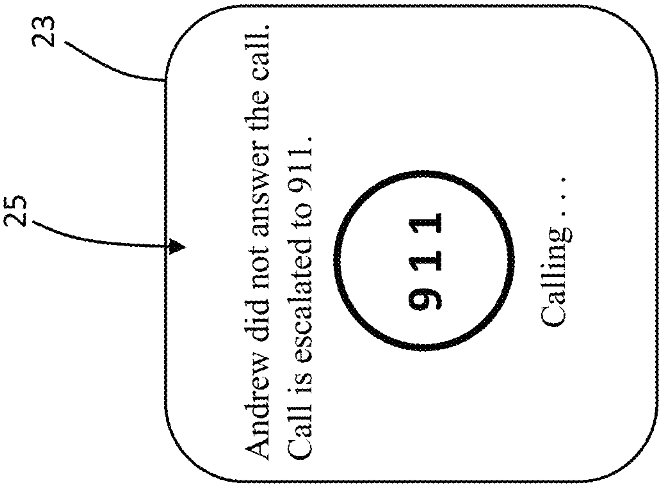
FIG. 5F is another exemplary illustration of the display screen of the wearable device showing the wearable device application displayed thereon.

FIG. 5C illustrates an exemplary screenshot of the device application 25 after "Andrew Jones" was selected, allowing the user to select "Call" in order to place a call or communicate with Andrew Jones, a caretaker. FIGS. 5D and 5E illustrate the device 10 or device application 25 initiating communication and communicating with a caretaker named Andrew Jones, for example, though his caretaker device 40 or application 45.

In at least one embodiment of the present invention, if, however, the device 10 or device application 25 is unable to connect with the selected caretaker, and more specifically, the caretaker device 40 or caretaker application. 45, then the wearable device 10 or device application 25 is configured to automatically place a call or initiate communications to an emergency service, such as but not limited to 9-1-1 or SMART911™. More specifically, if the user 12 of the device 10 attempts to initiate communication (e.g., two-way voice communication) with a caregiver using the communication capabilities of the device 10, and the attempt to initiate the communication with the caregiver device fails, then the wearable device 10 or wearable device application 25 of at least one embodiment will immediately and automatically initiate an emergency communication to a predetermined emergency service, as exemplified in FIG. 5F. In some cases, the device 10 may prompt the user 12 of the device 10, requiring an input for approval before the emergency communication is initiated, while in other embodiments, the emergency call will be initiated without any further input or confirmation by the user.

The emergency communication to an emergency service 40 may take place over any of the networks described herein, such as an LTE network, or other communication, telecommunication or data network.

In some embodiments, for example, when the device 10 includes a list of caregivers 122, the device 10 or device application 25 may attempt to initiate communication with other caregivers stored in the application 25 prior to initiating a call or communication to an emergency service. For example, if the user attempts to contact caretaker Andrew Jones and the communication fails, meaning, nobody, including Andrew Jones, answered the attempted communication with the caregiver device or application, then the device 10 or device application 25 may attempt to contact another caregiver, such as Mary Smith, saved in the device 10 or application 25 or otherwise paired or linked to the wearable device 10. In some embodiments, after all or after an additional predetermined number of caregivers fail to answer the attempted communications, then the device or device application 25 will automatically initiate a communication with an emergency service. In other cases, after a single failed communication attempt with a caregiver, the device 10 or device application 25 will automatically initiate the communication with an emergency service.

In addition, in some embodiments, once the emergency communication is initiated, the user 12 of the device 10 may not stop or cancel the emergency call to an emergency service. In other words, once the device 10 or device application 25 initiates the emergency communication, for example to 9-1-1 or SMART911™, the device 10 and device application 25 do not allow for the cancellation of such a communication.

Moreover, in at least one embodiment, the wearable device 10 or application 25 is not able to initiate outgoing communications with anyone other than approved, authorized or paired caregivers, e.g., caregiver devices or applications, such as via the list 122 of caregivers programmed or stored in the device 10, and with the emergency services as disclosed herein. In other words, in at least one embodiment, there is not a feature that allows the user to dial numbers or call contacts that are not preprogrammed in the device 10. The only communications the device can initiate are with paired caregiver devices or applications, and emergency services as disclosed herein.

It should also be noted that in at least one embodiment, the device 10 or device application 25 can be configured to block incoming communications from all devices or numbers except for one or more approved, authorized or paired caregiver devices 40, applications 45 or contact phone numbers. In other words, only approved, authorized or paired caregiver devices 40, applications 45 or contact phone numbers can initiate communications with the wearable device 10. In addition to paired caregiver devices or applications, some embodiments may allow approved or authorized emergency contacts (e.g., family members) to initiate communications with the device. Other embodiments may also allow 9-1-1 or Smart911 to also initiate communications with the device.

Next, and referring again to FIG. 5A, the device 10 or device application 25 includes a feature that, using the location or GPS module of the device, identifies to the user 10, via the device display screen and/or audible response, the current location of the device 10, and therefore, the current location of the user 12 wearing the device 10. This feature can be initiated with the selection of a single button or item, for example, 120*b*, which is labeled "Location," although other labels are contemplated, such as "Where am I?"

Figure 5I:
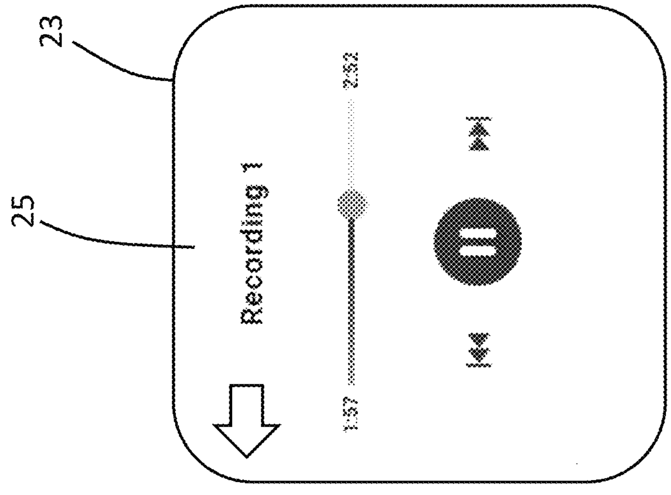
FIG. 5I is another exemplary illustration of the display screen of the wearable device showing the wearable device application displayed thereon.
Figure 5H:
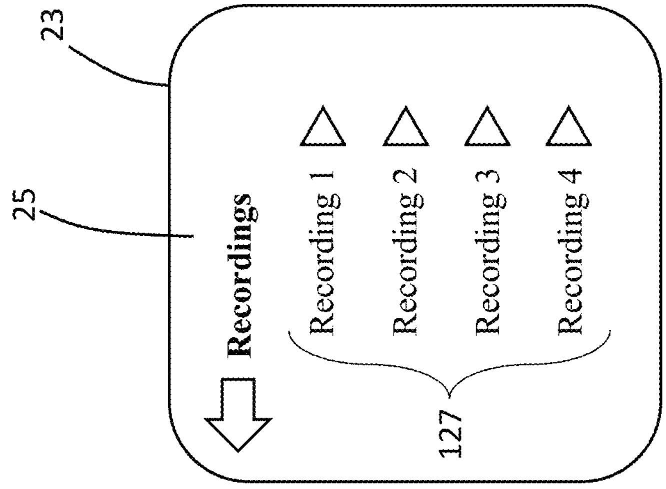
FIG. 5H is another exemplary illustration of the display screen of the wearable device showing the wearable device application displayed thereon.
Figure 5G:
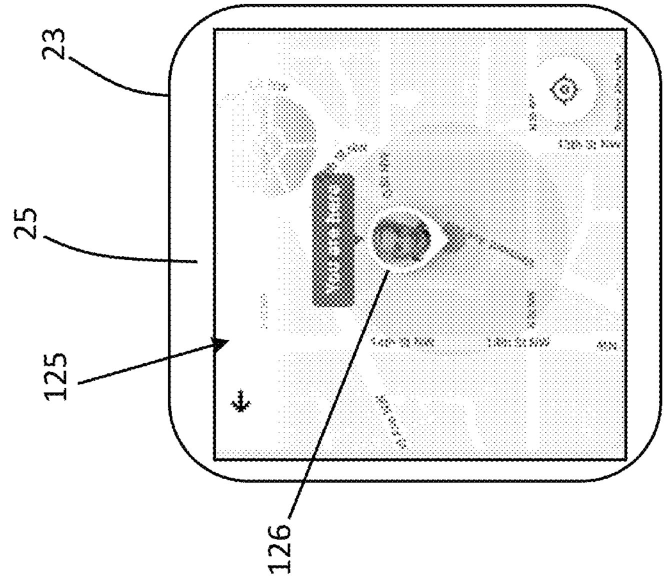
FIG. 5G is another exemplary illustration of the display screen of the wearable device showing the wearable device application displayed thereon.

More in particular, selecting the button 120*b* may display a screen similar to that shown in FIG. 5G. In this figure, a map 125 is displayed, with an icon or pin 126 (in this case a picture of the user's face) indicating where the device 10 is located. In some embodiments, an address or an approximate address may also be displayed to the user on the screen or via audible messages. This can allow the user to easily (e.g., with the push of a single button on the main or default screen of the device) identify his or her location. This can be particularly useful if the user has wandered off and gotten lost or if the user has called for help (either with a caregiver or an emergency operator) and the person on the call asks for an address identifying the user's current location.

With reference now to FIGS. 5H and 5I, the device 10 may store one or more audio recordings which can be easily accessed (e.g., via a button 120*c* on the main screen, shown in FIG. 5A). For example, selecting button 120*c* from the main screen may show a list 127 of prestored recordings which the user can access and play at any time. The recordings may be from loved ones, family members, friends, caregivers, etc. and can have virtually any content including loving or friendly sentiments, or instructions and reminders, for example, with regard to taking medications.

Figure 5K:
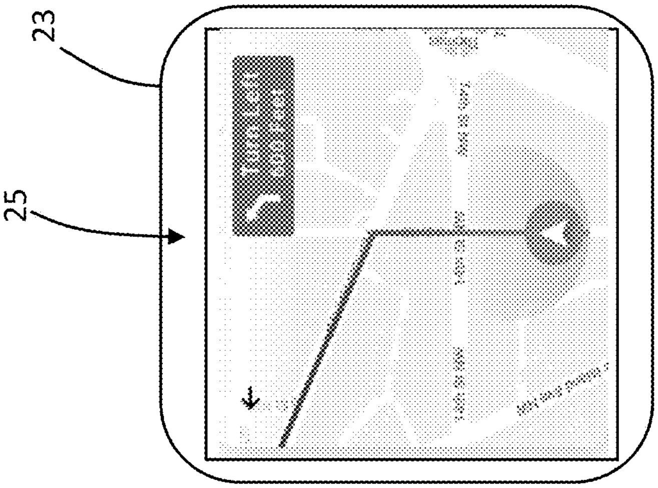
FIG. 5K is another exemplary illustration of the display screen of the wearable device showing the wearable device application displayed thereon.
Figure 5J:
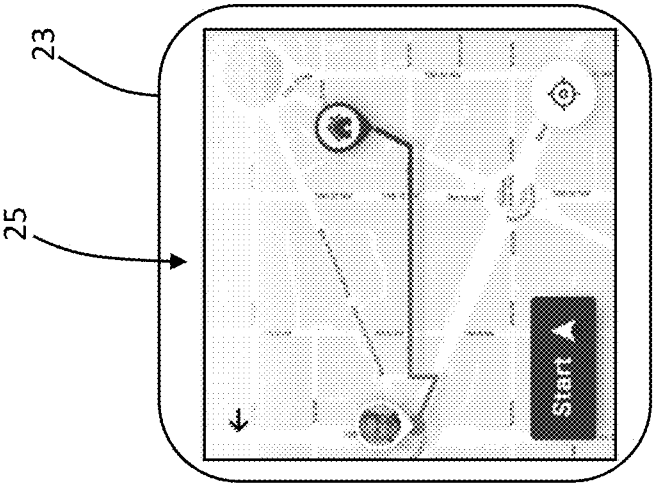
FIG. 5J is another exemplary illustration of the display screen of the wearable device showing the wearable device application displayed thereon.

Yet another feature of the device 10 and device application 25 of at least one embodiment is a way for the user to easily access (e.g. via a button on the main screen) and initiate instructions or directions between his or her current location and a stored (home) location, such as, back to his or her residence, hospital, facility, etc. In other words, the user may select button 120*d* shown in FIG. 5A, which in at least one embodiment will initiate a navigation to a stored location. In the embodiment shown, a map 128 is first displayed (e.g., FIG. 5J), and when the user then selects "Start" or other like button, the navigation sequence will begin (FIG. 5K). In other embodiments, pressing the button 120*d* on the main screen may automatically begin the navigation sequence, such that an initial map and an additional "Start" may not be necessary in all embodiments.

Furthermore, in some embodiments, the wearable device 10 may be capable of measuring or otherwise obtaining vital information from the user, including, for example, the user's heart rate, pulse, breathing rate, etc. In this manner, the device 10 of at least one embodiment, includes one or more physiological sensors 27 or monitors, for example, on and/or within the body 20 thereof. The sensor(s) 27 may therefore detect vital information or other physiological information, such as the heart rate or heartbeat of the user wearing the device, for example, on his or her wrist. The data obtained from the sensor(s) 27 can be stored locally on the device 10 and/or communicated to the caregiver device 40 or application 45 for storage and/or monitoring.

With reference now to FIGS. 6A through 6I, exemplary screenshots of portions of the caregiver application 45 are shown. For instance, the caregiver application 45 may be available for download for example from the APPLE® Appstore or the GOOGLE PLAY® STORE, although other locations for download of or access to the caregiver application 45 is contemplated. In some cases, the user or caregiver will need to first create an account with a management company or entity prior to being able to use or access the features of the caregiver application 45.

For individual use of the system 100 or caregiver application 45 disclosed herein, the application 45 is able to be downloaded and installed on the caregiver's personal smartphone device, thereby allowing the smartphone device to operate as the caregiver device 40 disclosed herein. For use of the system 100 by a hospital or other facility, caregiver devices 40 will be provided, which may include a smartphone or other like device preloaded with the caregiver application 45 and locked to other unrelated functionality. This will allow caregivers in facilities to use the system without having to download the application 45 onto a personal device, which could potentially violate certain privacy or other regulations and could pose a security risk.

Figure 6B:
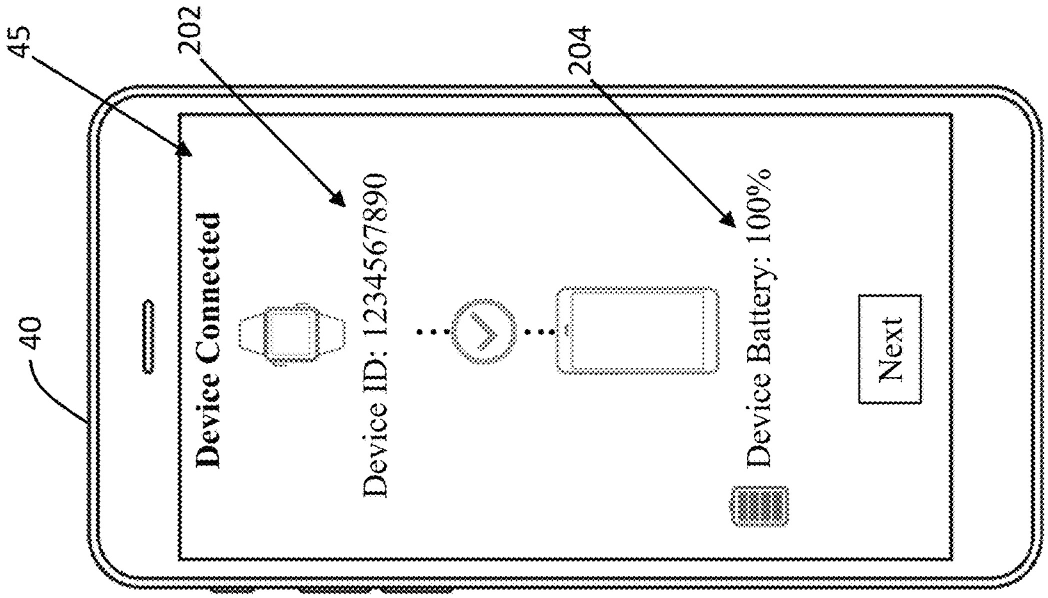
FIG. 6B is another exemplary illustration of the caregiver device showing the caregiver application displayed thereon.
Figure 6A:
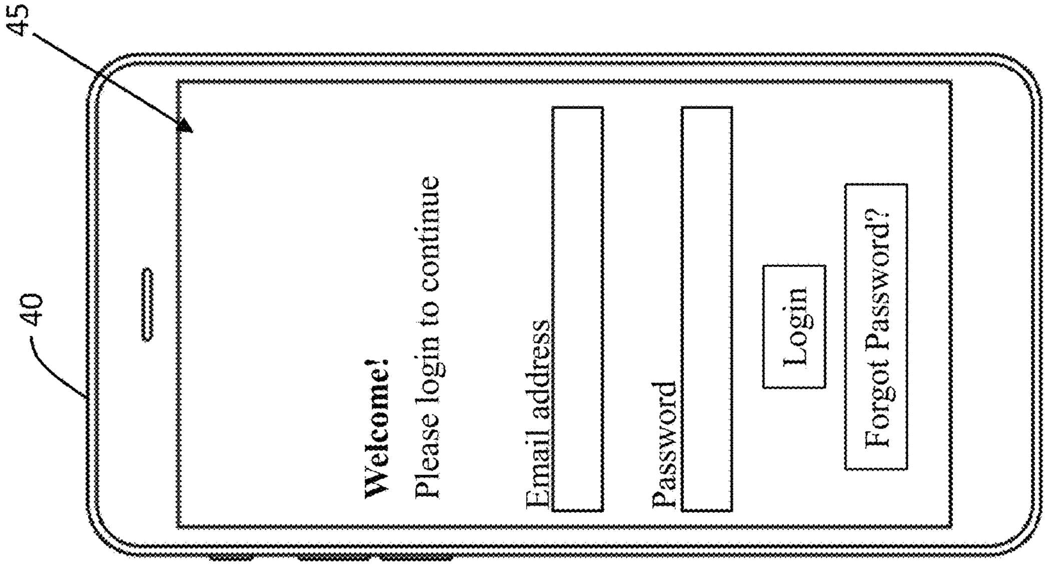
FIG. 6A is an exemplary illustration of the caregiver device showing the caregiver application displayed thereon.

In any event, with reference to FIG. 6A, for example, the user or caregiver may first need to use his or her credentials, such as email address (or username) and password, or other credentials, to log into the caregiver application.

FIG. 6B illustrates the caregiver device 40 being paired with or otherwise communicatively connected with a particular wearable device 10. For example, pairing the two devices, namely, a particular caretaker device 40 with a particular wearable device 10, allows the devices 40, 10 to communicate with one another via the system 100 of the present invention. For example, in at least one embodiment, if a particular caregiver device 40 is not linked or paired with a particular wearable device 10, then those two devices 40, 10 cannot communicate with one another in accordance with the present invention, meaning two-way voice calling is not available and communications of notifications or data from the wearable device 10 to the unpaired caretaker device 40 is not available. It should also be noted that one wearable device 10 may pair with or link to one or a plurality of caregiver devices 40. Similarly, one caregiver device 40 can pair with or link to one or a plurality of wearable devices 40.

In order to pair the device 40, 10 together, a number of different processes may be implemented in different embodiments. For example, in one embodiment, each wearable device 10 includes a device ID 202 that is unique to that particular device 10. In such a case, the unique device identification or device ID 202 corresponding to the wearable device 10 may be entered into the caregiver application 45. This will tell the caregiver application 45 the wearable device 10 with which to pair. In some cases, confirmation may need to be provided on one or both of the wearable device 10 and/or caregiver device 40. In addition, or instead, one or both of the devices 40, 10 may communicate with one another wirelessly, e.g., via Bluetooth, Wifi, or other network 15 to exchange or communicate unique identifying information.

In other embodiments, such as, when a dashboard 80 is used in connection with the invention (e.g., as used by a facility or institution), the dashboard or management system 80 described herein may be used to link or pair devices 10, 40. This will be described below in connection with FIGS. 7A through 7F.

Furthermore, once the devices 40, 10 are paired, in at least one embodiment, certain contact details associated with the caregiver's account or with the caregiver device 40 may be communicated to and/or stored on the wearable device 10. For example, the caregiver's name, phone number, a photograph or avatar may be communicated to the wearable device, e.g., wirelessly, and stored on the wearable device 10. Then, when the user 12 of the wearable device 10 attempts to initiate a communication with a caregiver, the caregiver's contact information or identification is already stored and available, as shown in FIG. 5B, for example. Other embodiments may allow the transfer, communication, entry or storage of caregiver contact information (name, phone number, device identification, etc.) in other ways.

Still referring to FIG. 6B, as referenced at 204, the wearable device 10 may communicate certain status details, such as, a current battery level 204, to the caregiver device 40. This allows the caregiver device 40 and caregiver to monitor the battery level of each paired wearable device 10 and to charge or instruct another person to charge the wearable device 10 when necessary.

Another feature of at least one embodiment of the present invention is the ability to create or define a geofence 210 and associate that geofence 210 with a wearable device 10. In particular, a geofence 210 is a virtual perimeter of a real-world geographic location. The geofence 210 can be defined in terms of a distance or radius from a selected or defined point or address. In other cases, the geofence can be defined in terms of boundaries selected or defined by the user. In this manner, the geofence 210 can, in some cases, represent a uniform circular shape, as shown in the example of FIG. 6C, or the geofence can be irregularly shaped, for example, when customized or defined by identified boundaries.

Figure 6C:
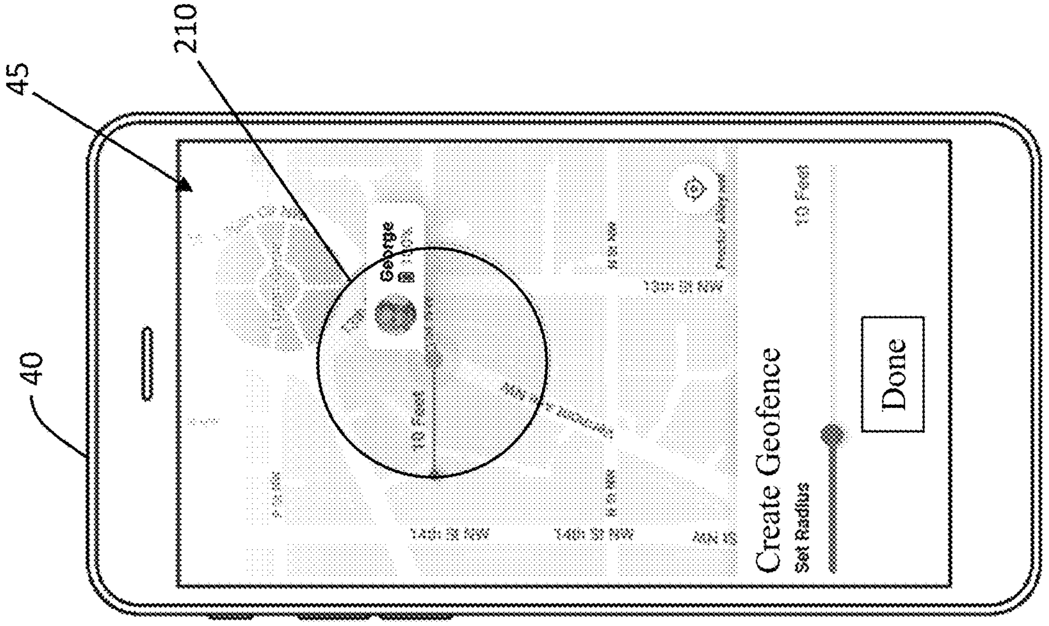
FIG. 6C is another exemplary illustration of the caregiver device showing the caregiver application displayed thereon.

In at least one embodiment, as shown in FIG. 6C, the geofence 210 is created or defined by the caregiver using the caregiver application 45 or caregiver device 10. In other embodiments, the geofence can be generated or created via a dashboard or management system 10, as described below. In the example shown, in FIG. 6C, the geofence is defined by a radius of 10 feet, which can be set or selected at higher or lower distances. As an example, the caregiver can use the geofence to generally surround or define an area within which the user 12 resides or is being cared for.

In this manner, the location module, e.g., a GPS module, of the wearable device 10 will determine the location of the device 10 in real-time or in near real-time to determine whether the device 10 has travelled outside of the geofence 210. When or if the device 10 travels outside of the geofence or otherwise beyond the boundaries of the geofence, an alert may be generated and communicated to the caregiver device 40. This sequence can occur in different manners.

For example, in one embodiment, the geofence information resides on the caregiver device or application, which receives real-time or near real-time location data from the wearable device. In this manner, the caregiver application or device will receive the location of the wearable device and compare that location to the geofence to determine if the wearable device 10 has traveled outside of the geofence.

In another embodiment, once the geofence is created or defined, for example, on the caregiver application, as shown in FIG. 6C, the geofence data is wirelessly communicated to the wearable device 10. In this case, the wearable device 10 or application 25 will determine whether the device 10 has travelled beyond the confines or boundary of the geofence. When or if the device does travel outside of the geofence, the wearable device 10 or application 25 will communicate a corresponding notification to the caregiver application 45 or device 40.

In yet another embodiment, the geofence information resides on the management system 80, which receives real-time or near real-time location data from the wearable device. In this manner, the management system may receive the location of the wearable device and compare that location to the geofence to determine if the wearable device 10 has traveled outside of the geofence. The management system 80 may then also communicate notifications or alerts to the caregiver application or device.

In any case, the system 100 of at least one embodiment of the present invention is configured to generate, communicate and/or display various notifications or alerts to or on the caregiver device 40 or application 45. These notifications or alerts may, in some cases, be generated on the wearable device 10 and communicated to the caregiver device 40, similar to the first example of the geofence described above. In other embodiments, the notifications or alerts may be generated on the caregiver device 40 or application 45 based on data or information communicated by the wearable device, similar to the second example of the geofence described above. In further embodiments, the alerts or notifications may be generated or initiated by the management system 80 and communicated to the caregiver application or device.

Figure 6D:
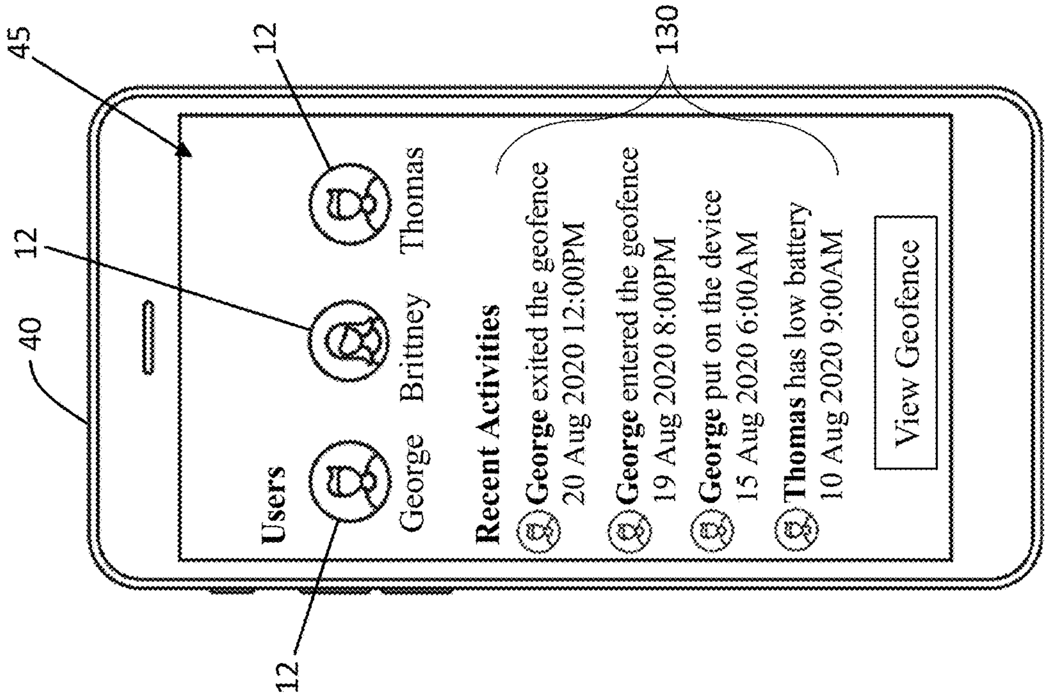
FIG. 6D is another exemplary illustration of the caregiver device showing the caregiver application displayed thereon.

In some cases, the notifications or alert may be considered emergency status notifications 130, as represented in FIG. 6D, which are generated upon the occurrence of a predetermined event. For example, a notification or alert may be generated when a user 12 or device 10 exits the defined geofence or when a user 12 or device 10 enters the geofence.

In those cases, the predetermined events are defined as a user or device exiting the geofence, and a user or device entering the geofence.

Figure 6E:
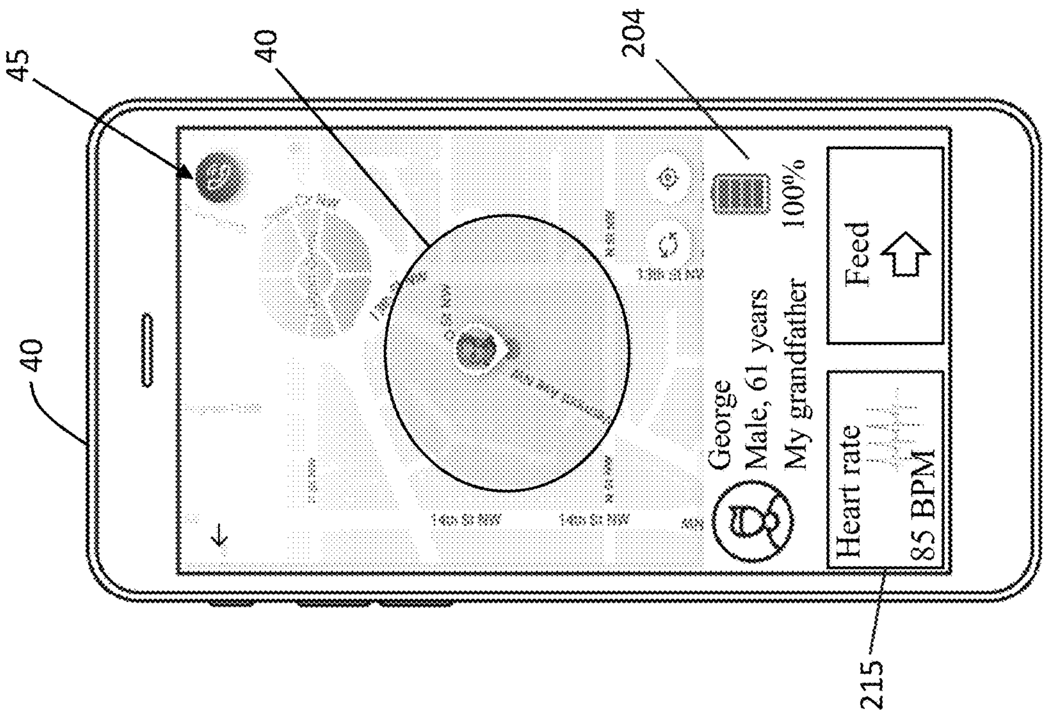
FIG. 6E is another exemplary illustration of the caregiver device showing the caregiver application displayed thereon.
Figure 6F:
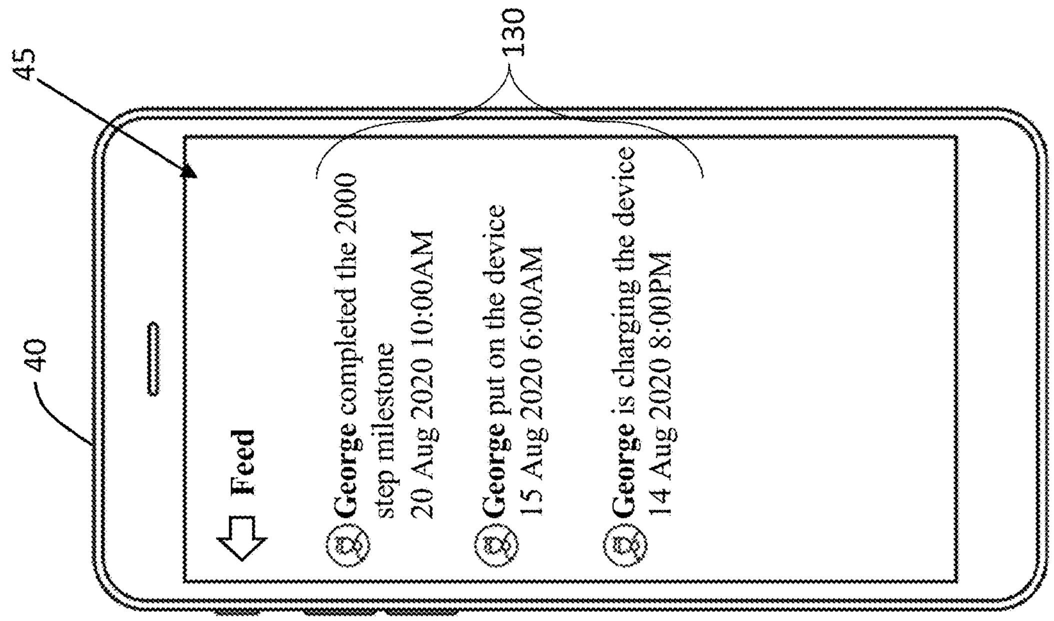
FIG. 6F is another exemplary illustration of the caregiver device showing the caregiver application displayed thereon.
Figure 6G:
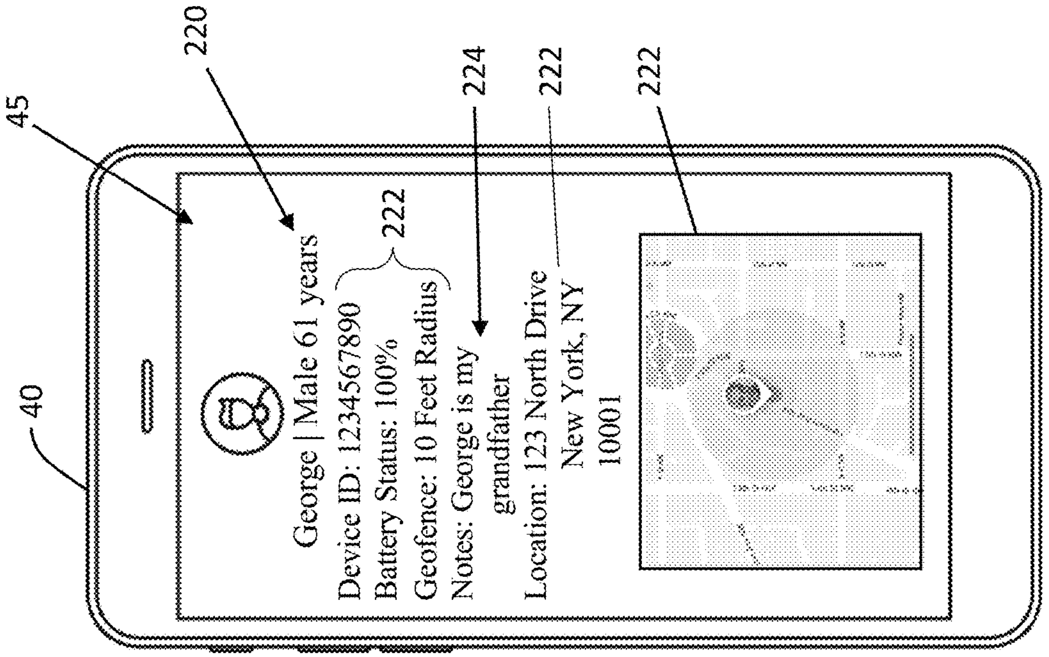
FIG. 6G is another exemplary illustration of the caregiver device showing the caregiver application displayed thereon.
Figure 6H:
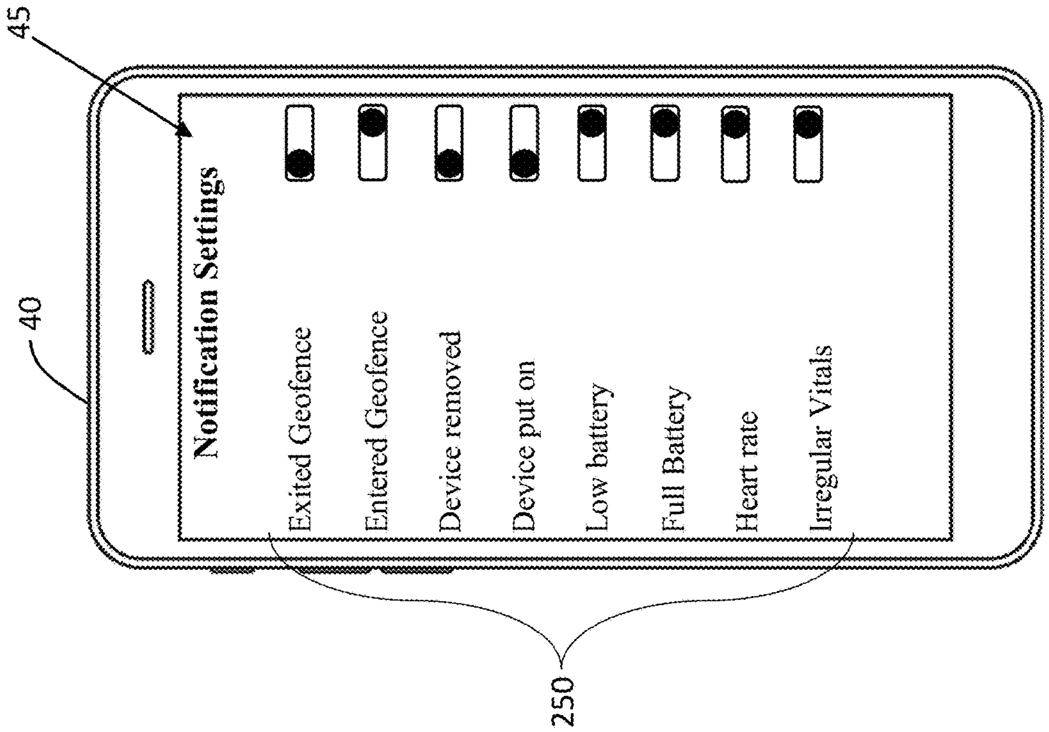
FIG. 6H is another exemplary illustration of the caregiver device showing the caregiver application displayed thereon.

With reference to FIG. 6H, a list of predetermined events 250 is shown. In this example, a user can select which notification(s) or alert(s) to activate or deactivate, for example, by sliding the bar on the right of FIG. 6D to the left or right. Other manners of activating or deactivating a notification or alert is contemplated and within the scope of the invention. An activated notification or alert will cause the application 45 or system 100 to generate and communicate an alert when the event occurs. A deactivated notification or alert 45 means that the application 45 or system 100 will not communicate the notification or alert upon the occurrence of the event.

As just an example, the predetermined events which may cause an alert to be generated and communicated or otherwise displayed on the caregiver device 40 or application 45 may include when a user or device exits a geofence, when a user or device enters a geofence, when the wearable device is removed from the user, when the wearable device is worn or put on the user, when the wearable device reports a battery level lower than a preset amount, when the wearable device has a full battery, when the heart rate exceeds or falls below predetermined levels, when there are irregular vitals detected, etc.

Referring back to FIG. 6D, the exemplary screenshot shows a number of users 12 of the wearable devices 10 which are paired to this particular caregiver device 40 or application 45. In the example, the users are George, Brittney and Thomas. A list of recent activities are shown on this screen with a number of alerts or notifications 130 corresponding to event that have occurrence with respect to these users 12.

FIG. 6E illustrates another feature of at least one embodiment—the ability to locate any paired device 10 and to track the user's location or device's location in real-time or near real-time using location-based and geofence technology. In particular, in FIG. 6E, the geofence 210 is shown with the user (George, in this case) located within the geofence on the map. Other user information can also be monitored or reviewed, including, for example, the user's 12 heart rate (or other vital information or physiological information captured by the physiological sensor(s) 27 on the wearable device), the device's current battery level, as well as notifications associated with the selected user. In this example, selection of the "Feed" or other like button will reveal a list of alerts, notifications or other like information associated with the selected user, as shown in FIG. 6F. For example, some of the alerts and notification may be considered emergency status notifications (e.g., as listed in FIG. 6H) while other may be non-emergency related notifications, such as "George completed the 2000 step milestone."

FIG. 6G illustrates another exemplary screenshot showing information associated with a user's 12 profile, in this example, George. In particular, the user profile illustrated in FIG. 6G provides biographical information 220 about the user (such as the user's name, sex and age), information about the device 222 (such as the device ID, battery status, current location and geofence details), as well as a section 224 for special notes. In this example, the notes indicate that this user is the caregiver's grandfather, although any notes can be input in this section. It should also be noted that the user's current location can be reported graphically on a map or via a physical address, as shown.

Figure 6I:
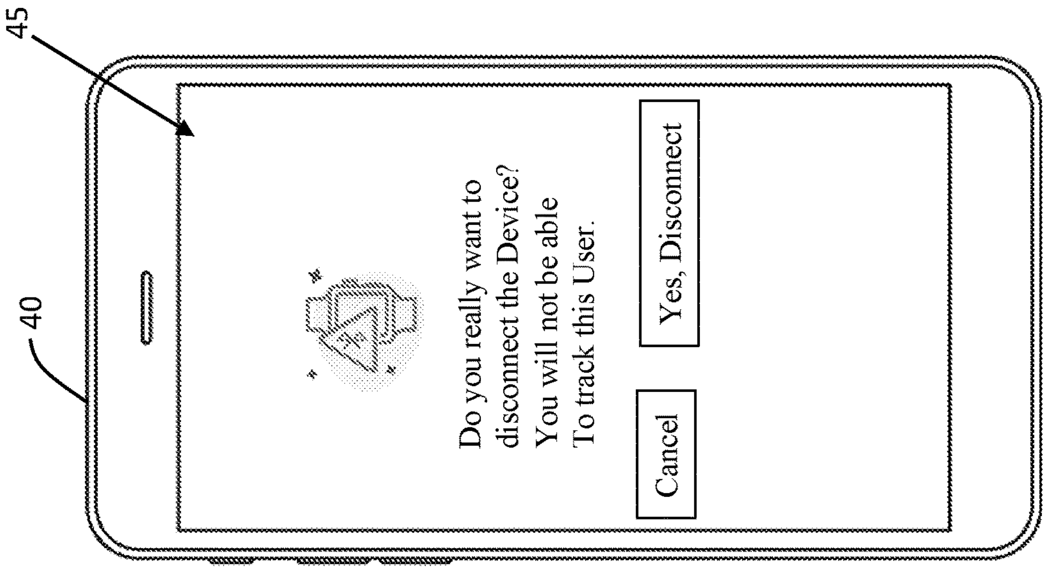
FIG. 6I is another exemplary illustration of the caregiver device showing the caregiver application displayed thereon.

With reference now to FIG. 6I, the caregiver device 40 or application 45 can disconnect from being paired with a particular wearable device 10 or application 25. In particular, as mentioned herein, only paired devices 10, 40 can communicate with one another via two-way voice communication, communication of data (location information, physiological sensor data, battery level data, etc.) or receive/display notifications or alerts, as described herein. When a caregiver device disconnects from a previously paired wearable device, the caregiver device cannot track the device's location, receive any data or notifications corresponding to that device or communicate with the device in any way.

Referring now to FIGS. 7A through 7F, an exemplary dashboard or management application 85 is shown. The dashboard or management application 85 of at least one embodiment may be executed or implemented on a management system 80, which may be a computer based system, such as, but not limited to a server computer system. In this manner, the management application or dashboard 85 may be accessed over the network 15 (shown in FIG. 1) by any other computer based device, such as, but not limited to a desktop computer, mobile computer or laptop, tablet computer, mobile device or smartphone, etc.

Accordingly, the management system 80 of at least one embodiment, includes a processor memory, a data storage device, and one or more communication modules.

Specifically, as used herein, the processor of at least one embodiment may include any device cooperatively structured to execute or implement computer instructions, software, etc., including, for example, the various features and components as described in accordance with at least one embodiment of the present invention, such as the dashboard or management application. The memory device, as used herein, may include but is not limited to random access memory (RAM) or other like devices configured to implement the present invention in the intended manner, for example, by storing and assisting with the execution of one or more applications, modules, or components capable of implementing the features as described herein. In some cases, the processor and memory can be combined to a single microcontroller as is known in the art. Further, the data storage device, as used herein, may include a hard disk drive, solid state drive, virtual drive, could-based storage drive, or other types of volatile or non-volatile memory. It should be noted that non-transitory computer readable media includes all computer-readable media except for a transitory, propagating signal.

The dashboard and management system 80 of at least one embodiment may be used by an administrator or management personnel, for example, at or on behalf of a facility or institution, in order to manage all of the wearable devices 10 and caregiver devices 40 or caregiver applications 45 associated with that particular institution or facility. In this manner, the management system 80 or management application 85 may communicate with the caregiver device 40 or caregiver application via the network 15 in order to implement various features and functionality described throughout this description.

Figure 7A:
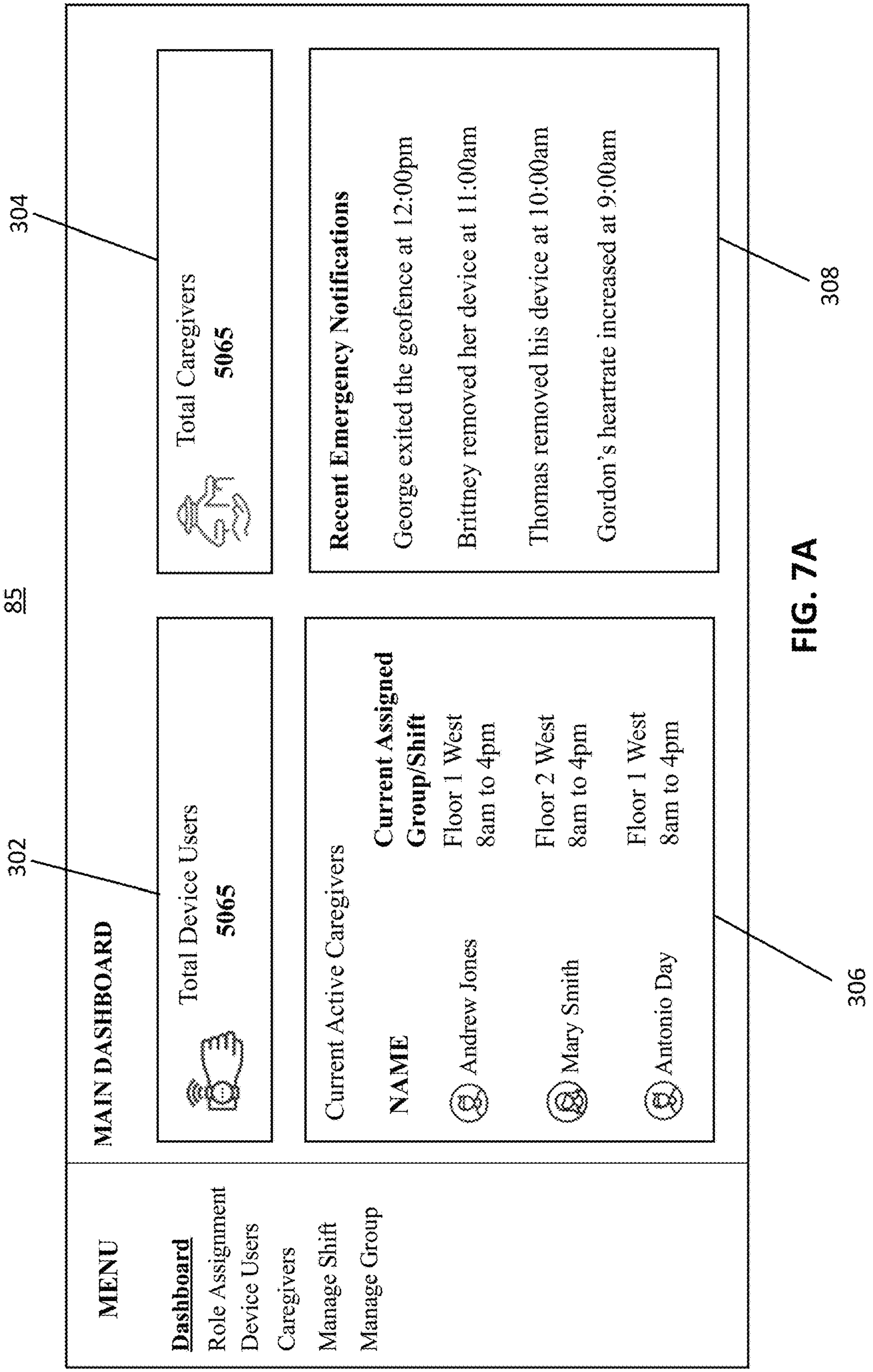
FIG. 7A is an illustrative screenshot of the management application or dashboard as disclosed in accordance with at least one embodiment of the present invention.

With reference now to FIG. 7A, an exemplary main dashboard screen is shown. In some cases, the main dashboard screen may display certain information associated with the various devices and caregivers. For example, a total number of wearable devices managed by the management system 80 may be shown or displayed, as referenced at 302, and a total number of caregivers operating within the facility or institution may be shown or displayed, as referenced at 304. Furthermore, as referenced at 306, a list of current active caretakers may be displayed or listed, along with the currently assigned group and/or shift. More in particular, the system 100 of at least one embodiment may assign each wearable device 10 to a group (e.g., "Floor 1 West") and may assign each caretaker device 40 or application 45 to a group and/or shift. This will be described more below in connection with FIGS. 7C through 7F.

Still referring to FIG. 7A, the main dashboard screen may also display or show recent emergency notifications, as referenced at 308. Accordingly, as mentioned above, the management system 80 of at least one embodiment may communicate with the wearable devices (for example, to receive location information, status data or information about the device, physiological information, etc.) and the caregiver devices or applications (for example, to communicate notifications, alerts, etc. based on information received from the wearable device). In other embodiments, the notifications and alerts may be generated on the wearable device or caregiver device and communicated to the management system for storage and display.

Figure 7B:
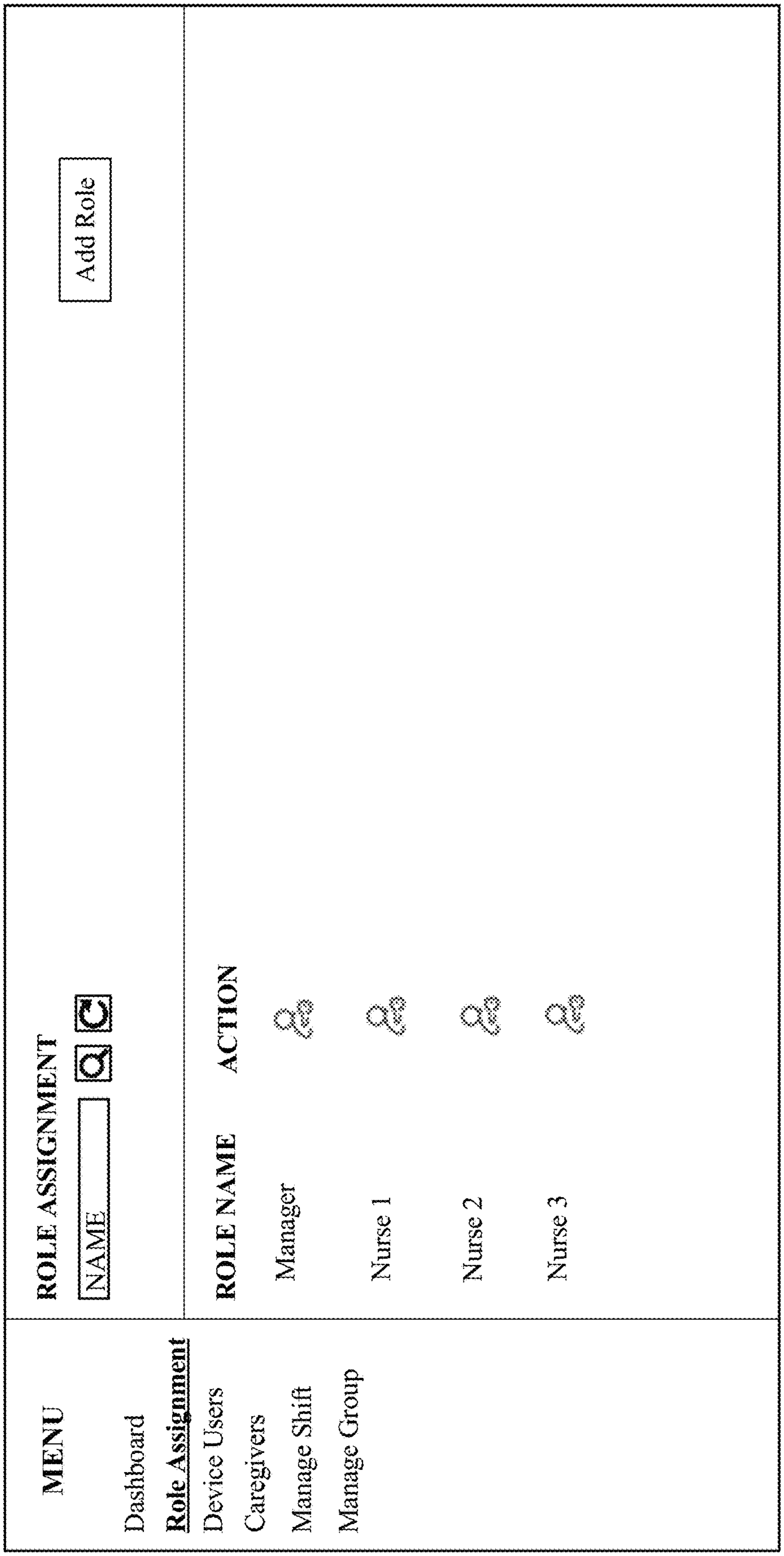
FIG. 7B is another illustrative screenshot of the management application or dashboard as disclosed in accordance with at least one embodiment of the present invention.

Referring now to FIG. 7B, a role assignment module is shown. This module is user to define roles, such as different staff positions, within the facility, and to manage the accessibility or restrictions of those roles to the management application.

Figure 7C:
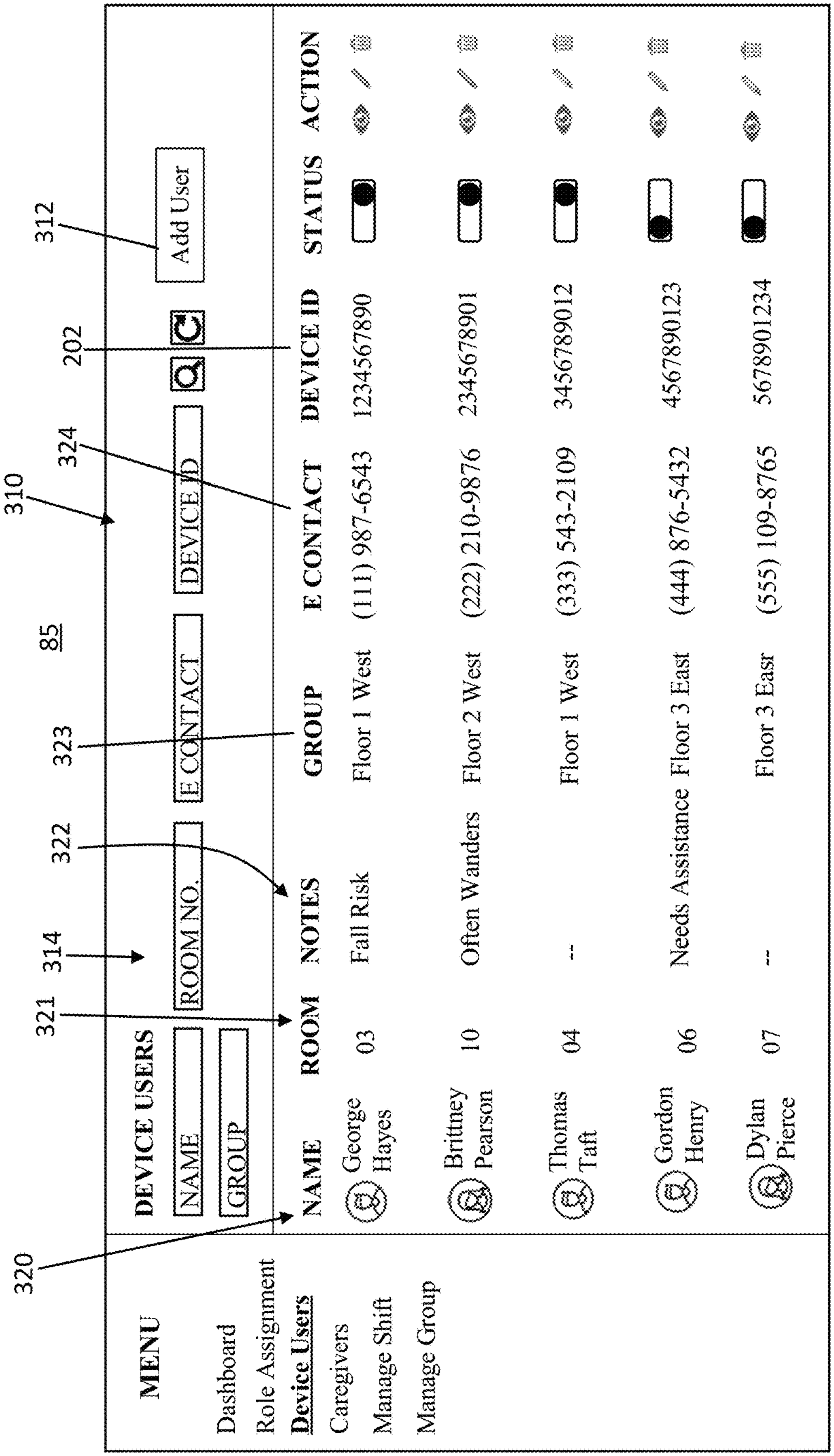
FIG. 7C is another illustrative screenshot of the management application or dashboard as disclosed in accordance with at least one embodiment of the present invention.

FIG. 7C illustrates a device user module, referenced as 310 which manages and tracks information associated with each of the wearable devices 10 and the users thereof that are associated with the particular facility. Within this module, devices or users are added and tracked, for example, by entering the device ID 202. Other information may also be entered, stored and managed, such as the user's name 320, a room number 321, notes 322, group 323, emergency contact information 324, etc. The room number 321 indicates where the user is staying within the facility. In other cases, other identifying location information such as floor, building, etc. may be provided. Notes may be provided to track certain additional aspects of each user, and may be edited or entered via free form text. Emergency contact information 324 may include a phone number, as shown, although other information may be included, such as name, address, relation to the user, etc.

This information corresponding to the users and/or devices can be added in many different manners, such as, for example, selecting "Add User" shown at 312 in FIG. 7C where the information can be manually entered or keyed in. Other methods may allow for a more automatic entry of some data. A search feature 314 may be included allowing for an individual to enter some data and search for records corresponding to this module 310.

Further, as mentioned above, each of the wearable devices 10 have a device ID 202 that is unique to each particular device 10. In this manner, the device ID 202 of each device 10 can be used to differentiate or identify each of the different wearable devices 10. As shown the device ID is a ten-digit number, however, virtually any other formats can be used, including alphanumeric formats with more or less characters.

In at least one embodiment, some or all of the wearable devices can be assigned to a group, as referenced at 323. A group 323 can but does not need to represent a section of the facility or institution, for example, within which the user associated with the device resides or stays. In other embodiments or implementations, the groups be representative of other aspects of the facility or have no correlation to the facility or institution.

Figure 7D:
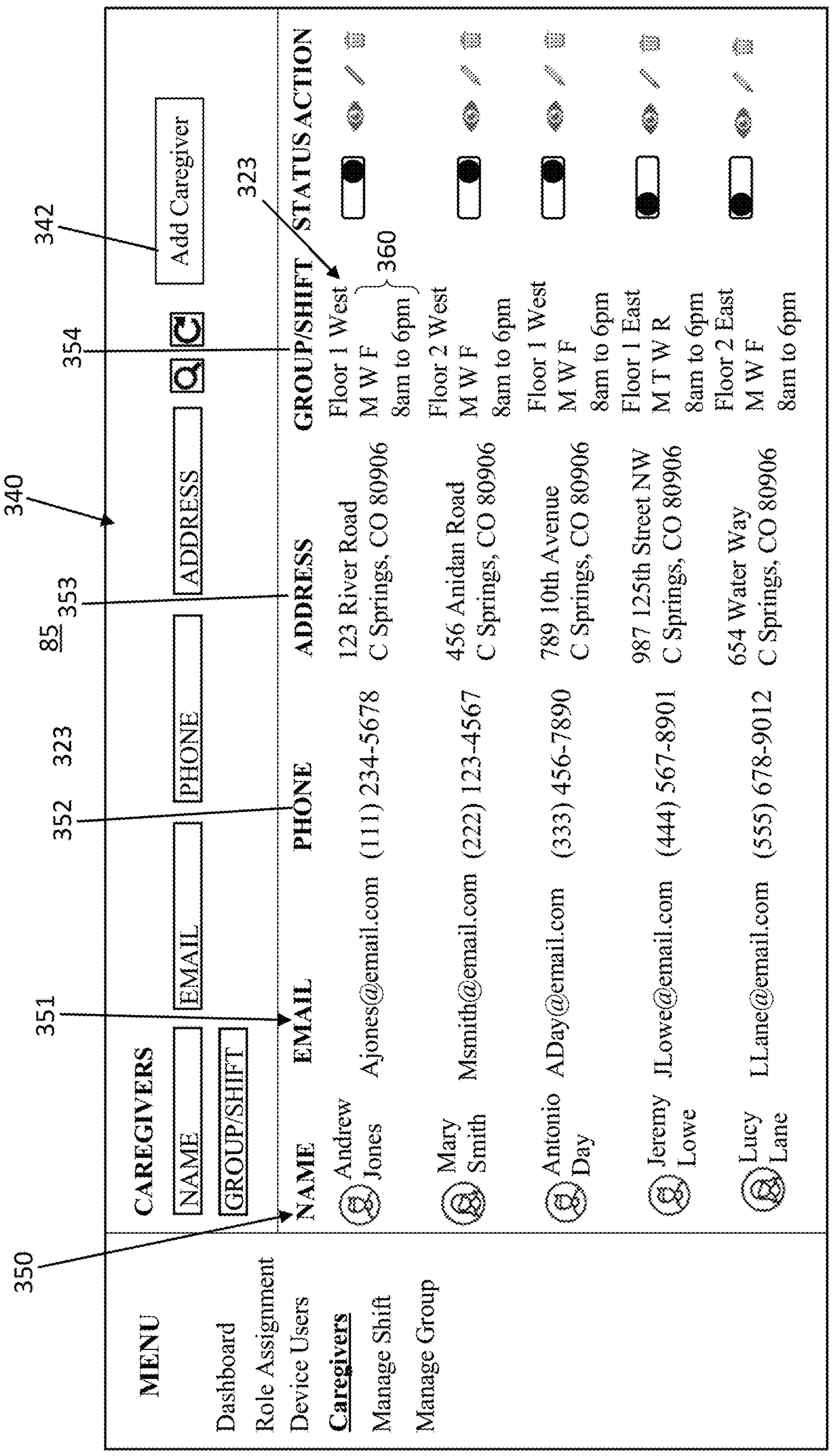
FIG. 7D is another illustrative screenshot of the management application or dashboard as disclosed in accordance with at least one embodiment of the present invention.
Figure 7E:
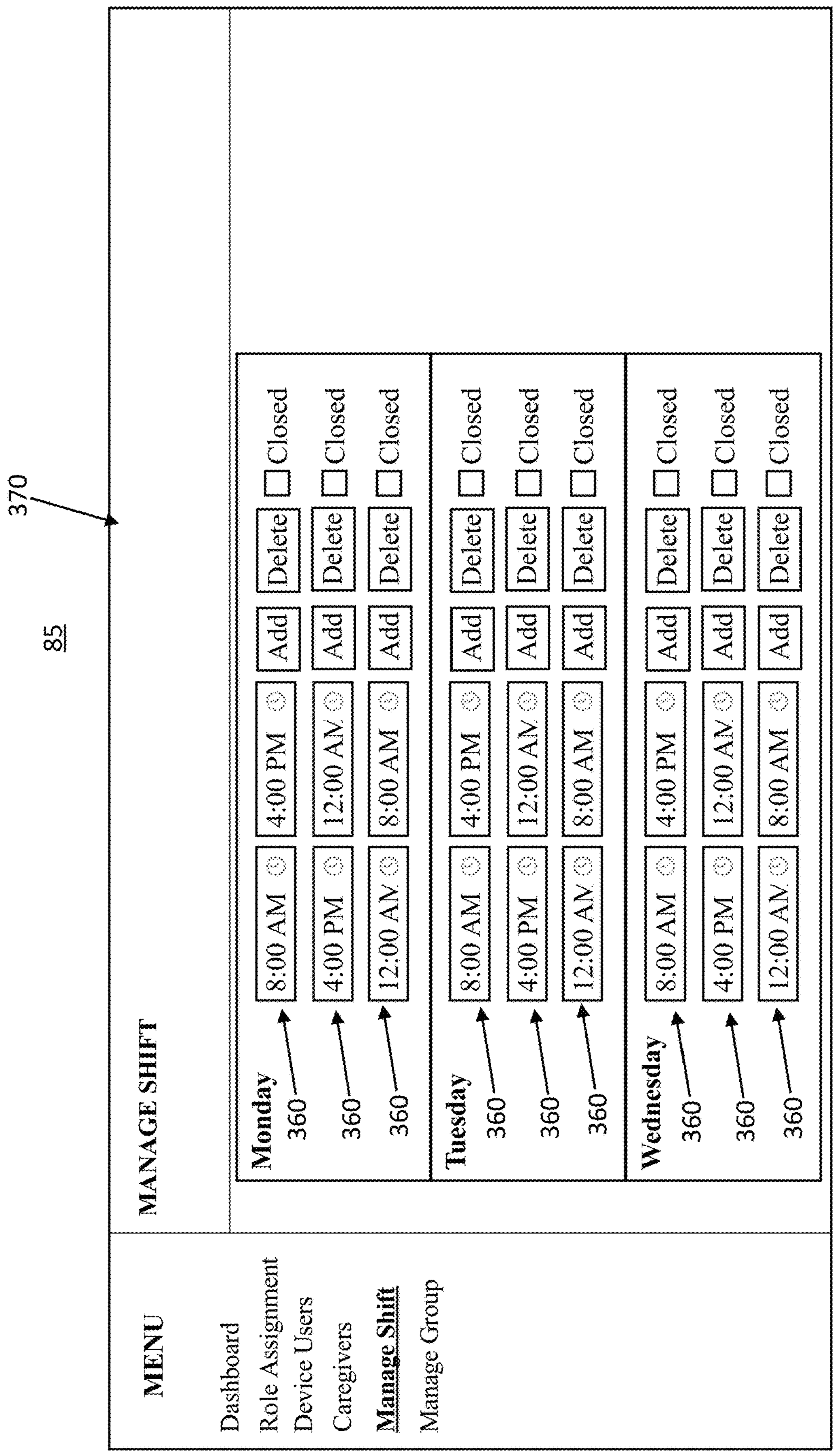
FIG. 7E is another illustrative screenshot of the management application or dashboard as disclosed in accordance with at least one embodiment of the present invention.
Figure 7F:
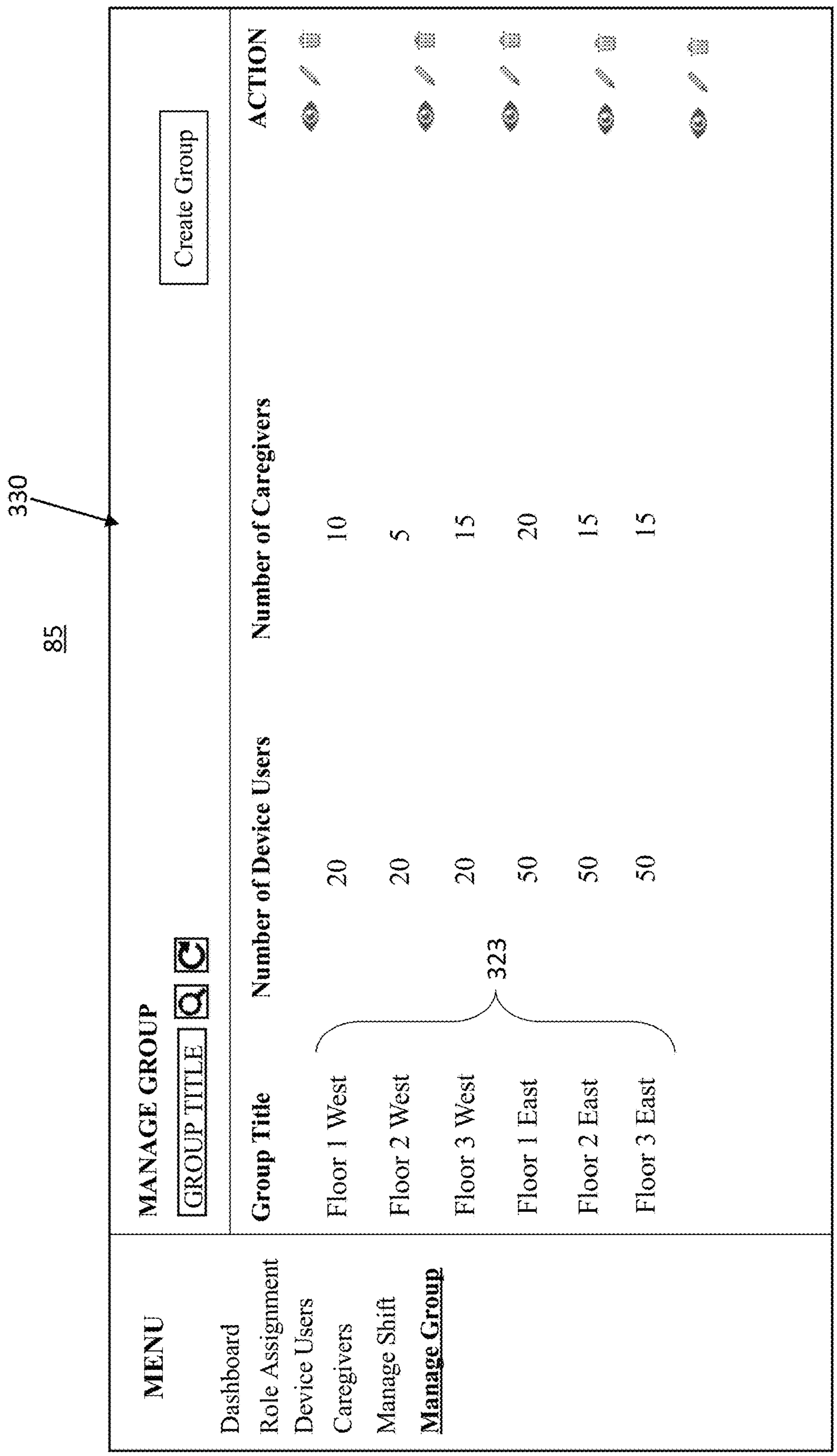
FIG. 7F is another illustrative screenshot of the management application or dashboard as disclosed in accordance with at least one embodiment of the present invention.

With reference to FIG. 7F, for example, a manage group module 330 is shown. This module allows groups 323 to be defined and managed. In the exemplary embodiment, there are six different groups shown, each representative of different areas or sections of a facility. In this example, the groups 323 are identified as "Floor 1 West," "Floor 2 West," "Floor 3 West," Floor 1 East," Floor 2 East," and "Floor 3 East." Virtually any title can be used to define a group, and thus, these exemplary groups are not limiting in any manner. In any event, using this module, groups can be added, for example, via the "Create Group" button 332 or searched. In this example, the manage group module 330 also shown the number a device users associated with each group and the number of caregivers associated with each group. This number can be representative as the number of device users and caregivers that are actually assigned to the group or in other cases the maximum number of users and caregivers that can be assigned to the group.

Referring back to FIG. 7C, each of the device ID's are assigned to one or more groups, as shown at 323. This can be done when the user is added to the module 310 or subsequently by editing the entry. The assigned group for a particular user or device ID can change over time, for example, if the user gets moved to a different area of the facility. In some cases, a single user or device ID may be assigned to multiple groups. It should be noted that in some embodiments there may be some device ID's that are not assigned to a group.

FIG. 7D illustrates a caregiver module, referenced as 340 which manages and tracks information associated with each of the caregivers, caregiver devices 40 or caregiver applications 45 that are associated with the particular facility. Within this module 340, caregivers are added and tracked, for example, by entering the caregiver's name 350, email address 351, or other unique identifying information associated with the caregiver's account with the management system or caregiver application, such as the caregiver's username (not shown), a unique caregiver ID (not shown), etc. Other information may also be entered, stored and managed, such as the caregiver's phone number 302, address 353, group/shift information 354, etc.

This information corresponding to the caregiver can be added in many different manners, such as, for example, selecting "Add Caregiver" shown at 342 in FIG. 7D where the information can be manually entered or keyed in. Other methods may allow for a more automatic entry of some data. A search feature may be included allowing for an individual to enter some data and search for records corresponding to this module 340.

In at least one embodiment, some or all of the caregivers can be assigned to one or more groups 323, for example, one or more of the groups created via the manage group module represented in FIG. 7F. In this manner, the group 323 can but does not need to represent a section of the facility or institution which the caregiver is assigned to work.

More specifically, when a device ID and a caregiver are assigned to the same group, the wearable device 10 associated with the device ID and the caregiver device 40 or caregiver application 45 associated with the caregiver are now paired or linked as that term is used herein in accordance with at least one embodiment. More in particular, as described above, paired devices 10, 40 are able to communicate with one another and/or receive alerts and notifications, as described herein. Thus, once a caregiver is assigned to a group, he/she will be able to communicate with and/or receive alerts and notifications regarding each of the wearable devices 10 associated with the same group.

It should also be noted that the wearable device 10 of at least one embodiment will only display or list caregivers that are currently paired with that device 10. Similarly, in one embodiment, the caregiver device 40 and/or caregiver application 45 will only display profiles, information, data, etc. of wearable device 10 that are paired to that caregiver application or device.

Thus, in some embodiments, since the caregiver entries in the management system and the user entries in the management system can be edited and managed, changing the assigned group(s) of either the caregiver or the user can automatically pair or unpair the devices 10, 40, thereby changing the access to information thereby.

Furthermore, and still referring to FIG. 7D, in some embodiments, the caregiver is assigned to a shift, which may define a temporal range, such as a day and time when the working shift will occur (i.e., begin and end).

With reference now to FIG. 7E, a manage shift module 370 is illustrated. In this embodiment, an administrator or other user of the module can create (e.g., add), modify, or delete shifts 360. In the illustrated example, each day shown (Monday, Tuesday and Wednesday) has three shifts defined as being from 8:00 am to 4:00 μm, 4:00 μm to 12:00 am, and 12:00 am to 8:00 am. Although not shown, the other days of the week, i.e., Thursday, Friday, Saturday and Sunday, May also include defined shifts. In this example, the start and end times can be edited, each shift can be deleted, and closed.

Once the shifts are defined, in at least one embodiment, the shifts 360 can be assigned to the caregivers, as shown in FIG. 7D. It should be noted that in FIG. 7D, a single entry is provided for the group and shift, although separate entries can also be implemented. It should also be noted that a caregiver may be assigned to one group in one shift, and another group during another shift. In any event, in the example shown in FIG. 7D, the first caregiver listed, “Andrew Jones,” has been assigned to the group 323 “Floor 1 West” and the following shifts: Monday, 8:00 am to 6:00 pm, Wednesday 8:00 am to 6:00 μm and Friday 8:00 am to 6:00 pm, as represented by “M W F 8:00 am to 6:00 pm.”

In this manner, the shifts 360 can be used to limit communication between the wearable devices and the caregiver devices or applications as being only during the assigned shift. In other words, in at least one embodiment, the devices 10, 40 are considered paired devices, as used herein, when the devices or users thereof are assigned to the same group 323 and only during the time defined by the assigned shift 360. All other times, the devices are considered unpaired, and thus now access or communication via the system 100 is permitted.

Using the example above, Andrew Jones would only see, on his caregiver device 40, information associated with the wearable devices in the “Floor 1 West” group, and only from 8:00 am to 6:00 pm on Monday, Wednesday and Friday.

Further features of at least one embodiment of the present invention include the ability to record and store various information gathered by the wearable devices 10 or by the caregiver devices 40 or application 45. The information can be stored locally on the devices, remotely at the management system 80, in a different storage location, or in the cloud, for example. The information may include but is not limited to: the time and frequency of user-generated emergency calls made from each device 10 to a caregiver device 40 or application 45, the time it takes a caregiver to respond to any emergencies, time stamp and frequency that a wearable device exits and/or returns to the geofence, vital information recorded by the wearable devices 10, etc.

Moreover, additional features of certain embodiments of the present invention are that once the wearable device 10 is secured to or around the user’s body, such as around the user’s wrist, the device 10 is not intended to be removed, for example, by the wearer or user thereof. In particular, if the device 10 is removed or attempted to be removed from the wearer or user 12 thereof without authorization, for example, from a caregiver or management personnel, then in some embodiments, an alert, notification or signal is communicated to the caregiver device or application, management system, or emergency service. Further, the alert, notification or other communication can include location information (e.g., obtained from the GPS or other location module), as well as data stored on the device (e.g., on the storage device) or stored remotely from the device 10. The data can include one or more photographs of the user or wearer, medical information of the user or wearer, known conditions that may be impacting the user or wearer, contact information for one or more emergency contacts, allergies, etc.

In this manner, different embodiments of the present invention may employ different mechanisms to detect when the device 10 has been removed, and/or to prevent or restrict the unauthorized removal of the device 10.

As an example, in some embodiments one or more of the physiological sensors 27 may be used to detect or determine when the device 10 is being worn and when it has been removed. More specifically, if the heart rate monitor or sensor does not detect any heartbeat, then that could mean that the device 10 has been removed from the wearer. Other physiological sensors can be used to detect or determine when or if the device has been removed without authorization.

Referring again to FIGS. 4A and 4B, in some embodiments, a locking mechanism 90 may be implemented within the band 22 such that the band cannot be unlocked without authorization, for example, from the caregiver. In some cases, the caregiver device 45 may be configured to selectively dispose the locking mechanism 45 from a locked position (shown in FIG. 4A) to an unlocked position (shown in FIG. 4B). It is also contemplated that only a caregiver device, such as a caregiver device paired to the wearable device 10, can unlock the locking mechanism, or in other words, the only way to unlock the locking mechanism is with a caregiver device. For example, it is contemplated that the caregiver application 45 or device 40 may be used to wirelessly send an unlock signal or code to the locking mechanism in order to unlock the locking mechanism and remove the device 10 from the user 12.

Furthermore, in other embodiments, the only way the band can be removed from the user’s wrist or other body location is to physically cut or sever the band. When the band is cut or severed, the band may be configured to send a severance or other like signal to the body or to another location via network 15, indicating that the band has been cut, stretched, or otherwise physically damaged.

Figure 8A:
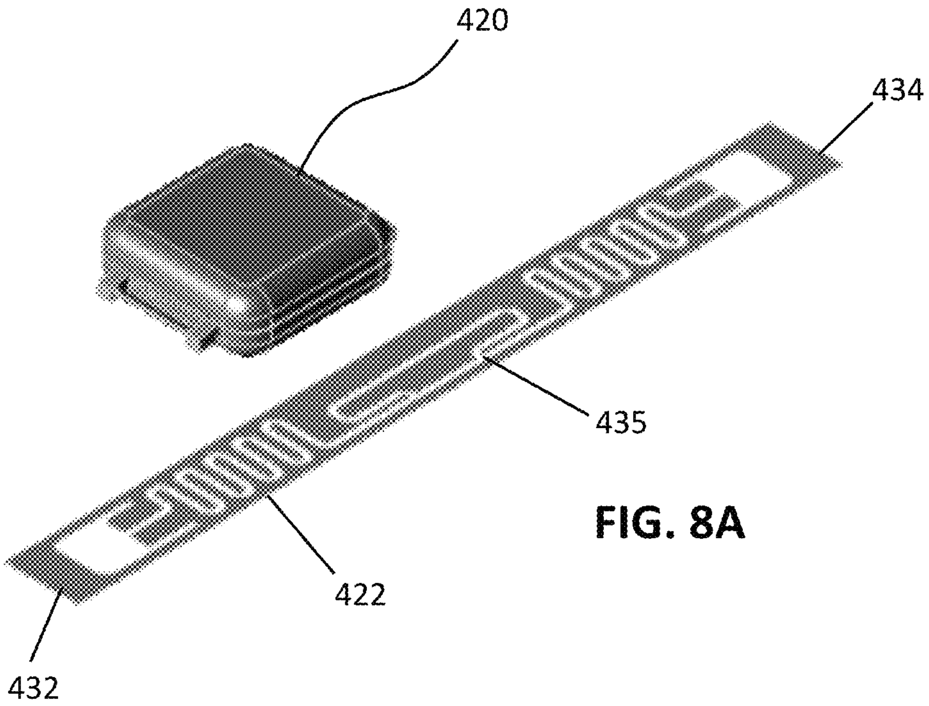
FIG. 8A is a perspective view of the device as disclosed in accordance with at least one embodiment of the present invention, with the band and the body separate for illustrative purposes.
Figure 8B:
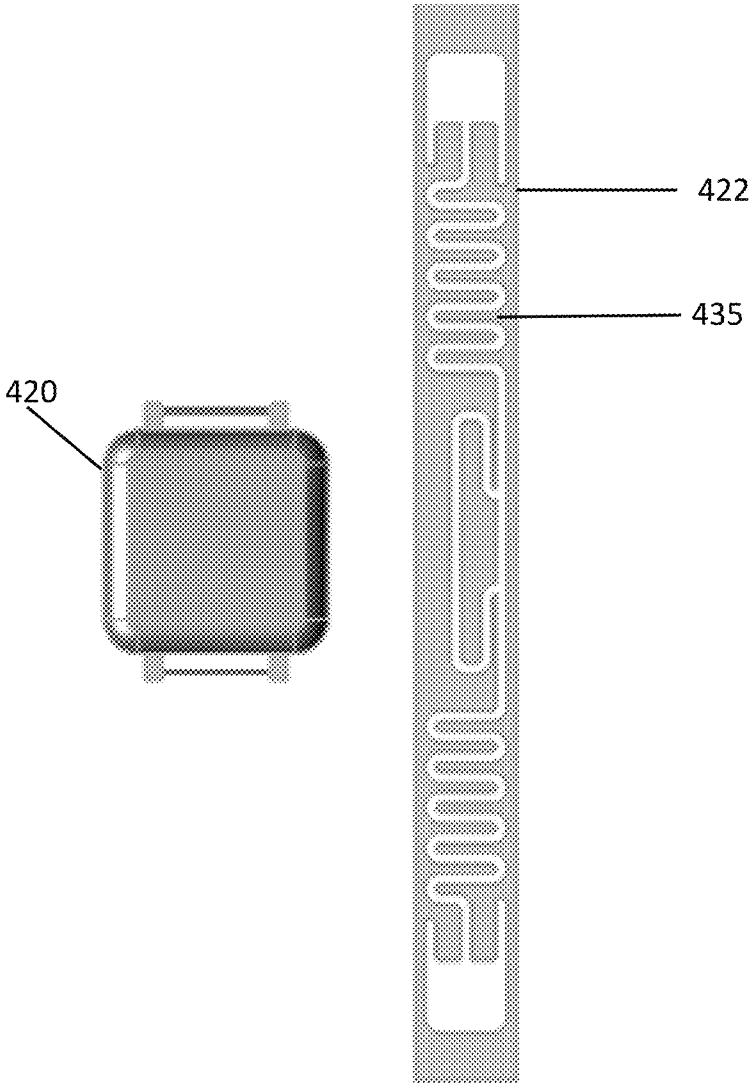
FIG. 8B is a top view of the personal security apparatus illustrated in FIG. 8A.

In one embodiment, as represented in FIGS. 8A and 8B, the band, represented as 422 may include a wired track, represented as 435 extending at least partially along the length of the band 422, for example, extending from or proximate a first end 432 to or proximate a second end 434. For instance, the wired track 435 may include a conductive loop, track or path that extends in a straight line or in a curved or snaked path through the band 422. In some case, the wired track may represent a completed conductive loop, the severance of which will be immediately detected.

For example, in at least one embodiment, the body 20 of the device may include one or more electrical or conductive terminals to which one or more corresponding electrical terminals on the band 422 will electrically connect, for example, when the band 422 and the body 20 connect to one another. This can create an electrical or conductive loop through the wired track 435 of the band 422.

In other embodiments, the band 422 and the body 20 can communicate wirelessly such that when the wired track 435 is severed, a wireless severance signal is communicated to the body 20, upon which an emergency signal or communication is automatically generated. As an example, the apparatus may utilize radio frequency identification (RFID) technology to communicate between the band 422 and the body 20. For instance, the band 422 of at least one embodiment may operate as a passive (or active) RFID tag, whereas the body 20 may operate as an RFID reader. Communication therebetween can thus operate via known RFID technology, for example, via inductive coupling, near-field coupling, electromagnetic coupling or far-field coupling. Other communication technologies, such as Bluetooth, NFC, Zigbee, etc. can be utilized, as well.

Moreover, the band 422 of at least one embodiment may be constructed or made of TYVEK® material, commonly used as entrance bands for events, concerts, or bars, as just an example. Once the band 422, or TYVEK® material, creates a loop, the only way to break the loop is to sever the band 422. Specifically, the band 422 may include an adhesive at or near one end, such as first end 432. The strength of the adhesive is such that once it attaches to along the length of the band 422 to form the loop, the adhesive cannot easily be removed without destroying the band 422.

In this manner, once the band 422 forms a loop around the user's wrist, ankle or other body location, the band 422 is not easily removable from the body without severing the band 422 or otherwise destroying the band 422. Severing of the band, for example, by cutting the band 422, would, in one embodiment, disrupt the wired track 435.

Other embodiments may include a band made of a waterproof, durable or rigid plastic, leather or rubber material with or without a similar wired track 435 disposed therein.

In some embodiments, the band 422 may include a designated location through which the band 422 can be severed without disrupting the wired track 435 or otherwise without triggering the emergency communications by the apparatus 10. In particular, in some cases, the parent(s), guardian(s), caretaker(s), or the user may want to remove the band 422, and therefore, the device, from the user's body or wrist. If there is a known location on the band 422 which can be cut without causing an emergency communication to be sent, then the band can be easily cut off. However, the location on the band which such a cut can be made should only be known by authorized individual(s) such that an assailant would not be able to know where to cut the band to avoid commencement of the emergency communication.

In other embodiments, a code may be input to the device in order to enable and/or disable the emergency communication capabilities. For example, in order to remove the band 422 from the user, a code may first be input into the body thereof, which will deactivate the wired track 435 or the emergency communication services. This will allow the band 422 to be severed by an authorized individual for authorized removal from the user.

It is also contemplated that the device can be remotely deactivated, for example, by a parent or other authorized individual. For instance, the authorized individual may use a computer, website, or application that is communicative with the apparatus. The authorized individual may log into a profile or account to control or manage the operation of the apparatus, for example, by activating and deactivating the emergency communication features described herein. Deactivation of the emergency communication services will allow the band to be removed without having the body communicate and emergency signal.

It should also be noted that the device 10 of at least one embodiment may include one or more buttons which allows the user to control some features of the apparatus. For example, one button may be used as an emergency alert button, which, when depressed or activated will automatically trigger the emergency signal or communication with the emergency services or contacts. Specifically, if, during an abduction, the assailant does not remove or attempt to remove the apparatus from the user, the user can still activate the emergency communications by depressing or activating an emergency button.

Other button(s) may be used to control the display (e.g., to change the display of the watch), or to scroll through additional features. For instance, in some embodiments, the apparatus may include additional medical features, such as blood pressure reading, blood sugar readings, etc. In some cases, the apparatus may automatically activate emergency communications based on these additional readings.

In some embodiments, the device 10 may aesthetically look like a watch, digital watch, or smart watch. This can be a particularly attractive features for individuals or users between the ages of 15 and 50, for example, who want to maintain the security of the device but want to keep the appearance of a watch. In other embodiments, the device may have an immediate appearance of being an emergency or personal security apparatus. In such an embodiment, an assailant May immediately attempt to remove the apparatus from the user, thereby triggering the emergency communications described herein.

In some cases, the emergency communications may be silent and therefore unknown or undetectable to an assailant or others around.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. A personal security apparatus, comprising:

a body and a band, said band being connected to said body and forming a loop disposable around a body portion of a user to define a user-wearable device, wherein physical damage to said band is required for removal of said loop from the body portion of the user, wherein said body of said personal security apparatus comprises a processor, a location module, and at least one communication module, said at least one communication module being communicatively disposed with an emergency service and at least one emergency contact, said band comprising a wired track disposed at least partially along a length thereof, said band being communicatively coupled with said body, wherein upon severance of said wired track, said band communicates a severance signal to said body, wherein, upon receipt of said severance signal from said band, said body automatically communicates with the emergency service, and wherein said band further comprises a non-discernible designated location through which said band is severable without severing said wired track.

2. The personal security apparatus as recited in claim 1 wherein said band comprises a first end and a second end, said first end comprising adhesive attachable along said length of said band to form said loop.

3. The personal security apparatus as recited in claim 2 wherein said band is made of TYVEK® material.

4. The personal security apparatus as recited in claim 1 wherein said band and said body are communicatively coupled to one another via at least one electrical connection.

5. The personal security apparatus as recited in claim 1 wherein said band and said body are communicatively coupled to one another via a wireless communication protocol.

6. The personal security apparatus as recited in claim 5 wherein said band comprises a radio frequency identification (RFID) tag and wherein said body comprises a radio frequency identification (RFID) reader.

7. The personal security apparatus as recited in claim 1 wherein said body is configured to communicate a location of said personal security apparatus to the emergency service upon receiving said severance signal from said band.

8. The personal security apparatus as recited in claim 7 wherein said body is further configured to communicate an image of a user of said personal security apparatus to the emergency service upon receiving said severance signal from said band.

9. The personal security apparatus as recited in claim 8 wherein said body is further configured to communicate medical information of the user of said personal security apparatus to the emergency service upon receiving said severance signal from said band.

10. The personal security apparatus as recited in claim 1 wherein said body comprises a watch display.

11. The personal security apparatus as recited in claim 1 wherein said wired track comprises at least one portion with a snaked configuration defined as comprising a plurality of back-and-forth paths crossing through a longitudinal center line of said band and extending proximate to opposing lateral sides of said band.

12. A personal security apparatus, comprising:

a body and a band, said band being connected to said body and forming a loop disposable around a body portion of a user to define a user-wearable device, wherein irreparable damage to said band is required for removal of said loop from the body portion of the user, wherein said body of said personal security apparatus comprises a processor, a location module, and at least one communication module, said at least one communication module being communicatively disposed with an emergency service, said band comprising a wired track disposed along a length thereof, said wired track comprising at least one portion with a snaked configuration defined as comprising a plurality of back-and-forth paths crossing through a longitudinal center line of said band and extending proximate to opposing lateral sides of said band, and wherein upon severance of said wired track, said body automatically communicates with the emergency service, and wherein said band further comprises a designated location through which said band is severable without triggering an emergency communication, wherein the designated location is only known by authorized individuals.

13. The personal security apparatus as recited in claim 11 wherein said band comprises a first end and a second end, said first end comprising adhesive attachable along the length of said band to form said loop.

14. The personal security apparatus as recited in claim 13 wherein said irreparable damage of said band occurs by severing said band or destroying said adhesive.

15. The personal security apparatus as recited in claim 11 wherein said band is several through designated location without severing said wired track.

* * * * *